United States Patent
Chung et al.

(12) United States Patent
(10) Patent No.: US 11,156,276 B2
(45) Date of Patent: Oct. 26, 2021

(54) LINEAR-ROTARY ACTUATOR

(71) Applicant: Delta Electronics, Inc., Taoyuan (TW)

(72) Inventors: Chi-Wen Chung, Taoyuan (TW); Po-Tzu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/722,898

(22) Filed: Dec. 20, 2019

(65) Prior Publication Data
US 2020/0124147 A1 Apr. 23, 2020

Related U.S. Application Data

(62) Division of application No. 15/255,392, filed on Sep. 2, 2016, now Pat. No. 10,557,534.

(30) Foreign Application Priority Data

Jul. 15, 2016 (TW) ................. 105122352

(51) Int. Cl.
*H02K 1/12* (2006.01)
*H02K 1/34* (2006.01)
(Continued)

(52) U.S. Cl.
CPC ........... *F16H 25/2204* (2013.01); *H02K 1/12* (2013.01); *H02K 1/34* (2013.01); *H02K 7/06* (2013.01);
(Continued)

(58) Field of Classification Search
CPC .. H02K 1/12; H02K 1/34; H02K 7/06; H02K 41/00; H02K 41/02; H02K 41/03; H02K 41/031; F16H 2025/20
See application file for complete search history.

(56) References Cited

U.S. PATENT DOCUMENTS 5,831,352 A * 11/1998 Takei .................... H02K 41/03
310/12.21
6,265,793 B1 * 7/2001 Korenaga ........... G03F 7/70758
310/12.02
(Continued)

FOREIGN PATENT DOCUMENTS

CN       203594748 U    5/2014
JP       2004120815 A    4/2004
(Continued)

OTHER PUBLICATIONS

Kamogawa, Machine Translation of JP2009044874, Feb. 2009 (Year: 2009).*
(Continued)

*Primary Examiner* — Quyen P Leung
*Assistant Examiner* — Eric Johnson
(74) *Attorney, Agent, or Firm* — Muncy, Geissler, Olds & Lowe, P.C.

(57) ABSTRACT

A linear-rotary actuator includes a base, a first linear motor, a second linear motor, a linear rail, and a ball screw. The first and second linear motors are disposed on the base and respectively have a coil assembly and a magnet backplane. The linear rail is located on the base. The ball screw includes a screw and a nut, wherein the screw is connected to the first linear motor, and the nut is connected to the second linear motor. When the screw and the nut are driven by the first and second linear motors to move along the linear rail in a synchronized manner, the linear-rotary actuator provides linear motion output. When the nut is driven by the second linear motor to move along the linear rail in an asynchronous manner with respect to the screw, the linear-rotary actuator provides rotary motion output.

5 Claims, 24 Drawing Sheets

(51) Int. Cl.
*H02K 7/06* (2006.01)
*H02K 41/02* (2006.01)
*F16H 25/22* (2006.01)
*F16H 25/20* (2006.01)

(52) U.S. Cl.
CPC ....... *H02K 41/02* (2013.01); *F16H 2025/204* (2013.01); *F16H 2025/2028* (2013.01); *F16H 2025/2081* (2013.01)

(56) References Cited

U.S. PATENT DOCUMENTS

| | | | |
|---|---|---|---|
| 2009/0278412 A1* | 11/2009 | Kimura | H02K 41/03 310/28 |
| 2013/0026279 A1* | 1/2013 | Agrikli | H02K 41/0356 242/476.7 |
| 2013/0278099 A1* | 10/2013 | Komatsu | H02K 41/03 310/80 |
| 2017/0247201 A1 | 8/2017 | Prussmeier | |
| 2018/0222042 A1 | 8/2018 | Prussmeier | |

FOREIGN PATENT DOCUMENTS

| | | | |
|---|---|---|---|
| JP | 2004312956 A | | 11/2004 |
| JP | 2006197770 A | | 7/2006 |
| JP | 2009044874 A | * | 2/2009 |
| JP | 2009044874 A | | 2/2009 |
| JP | 2011205748 A | | 10/2011 |
| KR | 20030013868 A | * | 2/2003 |
| KR | 20030013868 A | | 2/2003 |

OTHER PUBLICATIONS

Noh, Machine Translation of KR20030013868, Feb. 2003 (Year: 2003).*

Office Action dated Feb. 14, 2019 in CN Application No. 201610559688.6.

Ito, Machine Translation of JP2004120815A, Apr. 15, 2004 (Year: 2004).

Yoshida, Machine Translation of JP2004312956A, Nov. 4, 2001 (Year: 2004).

Noh, Machine Translation of KR20030013868A, Feb. 15, 2003 (Year: 2003).

Oga, Machine Translation of JP2011205748A, Oct. 13, 2011 (Year: 2011).

Kamogawa, Machine Translation of JP2009044874, Feb. 26, 2009 (Year: 2009).

Kuroda, Machine Translation of JP2006197770, Jul. 27, 2006 (Year: 2006).

* cited by examiner

LINEAR-ROTARY ACTUATOR

CROSS REFERENCE TO RELATED APPLICATIONS

This application is a Divisional application Ser. No. 15/255,392, filed on Sep. 2, 2016, which claims the benefit of Taiwan Patent Application No. 105122352, filed on Jul. 15, 2016, the entirety of which is incorporated by reference herein.

BACKGROUND OF THE INVENTION

Field of the Invention

The invention relates to a linear-rotary actuator, and in particular to a linear-rotary actuator which can utilize two linear motors and a ball screw to provide linear and rotary motion outputs.

Description of the Related Art

A linear motor is an actuator that creates motion in a straight line (i.e. linear motion) without an additional conversion mechanism. However, in many applications, such as an article handling or positioning process, there will be a need to provide linear and rotary motions.

Existing linear-rotary actuators which can provide linear and rotary motion outputs often use a linear motor to create linear motion and use a servo rotary motor to create rotary motion. However, a lot of additional conversion mechanisms are required to integrate the linear motor and the servo rotary motor because of the huge difference between their mechanisms. In addition, the servo rotary motor is mounted on the moving part of the linear motor, and thus its power cables and encoder cables will follow the movement of the moving part. Consequently, the reliability of the existing linear-rotary actuators is also bad.

BRIEF SUMMARY OF THE INVENTION

An object of the invention is to provide a linear-rotary actuator which can utilize two linear motors and a ball screw to provide linear and rotary motion outputs. No additional servo rotary motor is required in the linear-rotary actuator of the invention, and the aforementioned conventional problems can thus be solved.

An embodiment of the invention provides a linear-rotary actuator, including a base, a first linear motor, a second linear motor, a first linear rail, and a ball screw. The first linear motor is disposed on the base and includes a fixed first coil assembly and a movable first magnet backplane. The second linear motor is disposed on the base and includes a fixed second coil assembly and a movable second magnet backplane. The first linear rail is located on the base, and the first linear motor, the second linear motor, and the first linear rail are arranged parallel to each other. The ball screw includes a screw and a nut screwed together. Moreover, the screw is connected to the first magnet backplane and coupled to the first linear rail, and the nut is connected to the second magnet backplane and coupled to the first linear rail. When the screw and the nut are respectively driven by the first and second linear motors to move along the first linear rail in a synchronized manner, the linear-rotary actuator provides linear motion output; whereas when the nut is driven by the second linear motor to move along the first linear rail in an asynchronous manner with respect to the screw, the linear-rotary actuator provides rotary motion output.

In some embodiments, the base has a first side and a second side opposite to each other. The first and second coil assemblies are located on the first and second sides, respectively. The first magnet backplane is on the first side of the base and movable with respect to the first coil assembly, and the second magnet backplane is on the second side of the base and movable with respect to the second coil assembly. Also, the base further has a third side between the first and second sides, and the first linear rail is located on the third side.

In some embodiments, the linear-rotary actuator further includes a first linear slide block and a second linear slide block. The screw and the first magnet backplane are coupled to the first linear rail via the first linear slide block, and the nut and the second magnet backplane are coupled to the first linear rail via the second linear slide block.

In some embodiments, the linear-rotary actuator further includes a second linear rail, a third linear rail, a third linear slide block, and a fourth linear slide block. The second and third linear rails are located on the first and second sides of the base, respectively. The first magnet backplane is coupled to the second linear rail via the third linear slide block. The second magnet backplane is coupled to the third linear rail via the fourth linear slide block.

In some embodiments, the second and third linear rails are adjacent to a fourth side of the base that is between the first and second sides and opposite the third side of the base, and the second and third linear rails are parallel to the first linear rail, the first linear motor, and the second linear motor.

In some embodiments, the linear-rotary actuator further includes a fourth linear rail, a fifth linear slide block, and a sixth linear slide block. The fourth linear rail is located on a fourth side of the base that is between the first and second sides and opposite the third side of the base. The first magnet backplane is coupled to the fourth linear rail via the fifth linear slide block. The second magnet backplane is coupled to the fourth linear rail via the sixth linear slide block.

In some embodiments, the fourth linear rail is parallel to the first linear rail, the first linear motor, and the second linear motor.

In some embodiments, the first and second coil assemblies are located on a first side of the base. The first magnet backplane is on the first side of the base and movable with respect to the first coil assembly. The second magnet backplane is on the first side of the base and movable with respect to the second coil assembly. The first linear rail is located on the first side of the base and between the first and second coil assemblies.

In some embodiments, the linear-rotary actuator further includes a first linear slide block and a second linear slide block. The screw and the first magnet backplane are coupled to the first linear rail via the first linear slide block, and the nut and the second magnet backplane are coupled to the first linear rail via the second linear slide block.

In some embodiments, the linear-rotary actuator further includes a second linear rail, a third linear rail, a third linear slide block, a fourth linear slide block. The second linear rail is positioned on the first side of the base and located on a side of the first coil assembly opposite the first linear rail. The third linear rail is positioned on the first side of the base and located on a side of the second coil assembly opposite the first linear rail. The first magnet backplane is coupled to the second linear rail via the third linear slide block. The second magnet backplane is coupled to the third linear rail via the fourth linear slide block.

In some embodiments, the second and third linear rails are parallel to the first linear rail, the first linear motor, and the second linear motor.

Another embodiment of the invention also provides a linear-rotary actuator, including a first base, a second base, a first linear motor, a second linear motor, a first linear rail, a second linear rail, and a ball screw. The first base and the second base are parallel to each other. The first linear motor is disposed on a first side of the first base adjacent to the second base and includes a fixed first coil assembly and a movable first magnet backplane. The second linear motor is disposed on a second side of the second base adjacent to the first base and includes a fixed second coil assembly and a movable second magnet backplane. The first linear rail is located on the first side of the first base. The second linear rail is located on the second side of the second base, and the first linear motor, the second linear motor, the first linear rail, and the second linear rail are arranged parallel to each other. The ball screw is disposed between the first and second linear motors and includes a screw and a nut screwed together. Moreover, the screw is connected to the first magnet backplane and coupled to the first linear rail, and the nut is connected to the second magnet backplane and coupled to the second linear rail. When the screw and the nut are respectively driven by the first and second linear motors to move along the first and second linear rails in a synchronized manner, the linear-rotary actuator provides linear motion output; whereas when the nut is driven by the second linear motor to move along the second linear rail in an asynchronous manner with respect to the screw, the linear-rotary actuator provides rotary motion output.

In some embodiments, the first coil assembly is located on the first side of the first base. The first magnet backplane is on the first side of the first base and movable with respect to the first coil assembly. The second coil assembly is located on the second side of the second base. The second magnet backplane is on the second side of the second base and movable with respect to the second coil assembly.

In some embodiments, the linear-rotary actuator further includes a first linear slide block and a second linear slide block. The screw and the first magnet backplane are coupled to the first linear rail via the first linear slide block. The nut and the second magnet backplane are coupled to the second linear rail via the second linear slide block.

In some embodiments, the linear-rotary actuator further includes a third linear rail, a fourth linear rail, a third linear slide block, and a fourth linear slide block. The third and fourth linear rails are respectively located on the first side of the first base and the second side of the second base and parallel to each other. Moreover, the third linear rail is located on a side of the first coil assembly opposite the first linear rail, and the fourth linear rail is located on a side of the second coil assembly opposite the second linear rail. The first magnet backplane is coupled to the third linear rail via the third linear slide block. The second magnet backplane is coupled to the fourth linear rail via the fourth linear slide block.

Another embodiment of the invention also provides a linear-rotary actuator, including a base, a first linear motor, a second linear motor, a first linear rail, a second linear rail, and a ball screw. The base has a first side. The first linear motor is disposed on the first side of the base and includes a fixed first coil assembly and a movable first magnet backplane. The first magnet backplane has a first side and a second side opposite to each other, and the first side of the first magnet backplane faces the first side of the base. The second linear motor is disposed on the second of the first magnet backplane and includes a fixed second coil assembly and a movable second magnet backplane. The first linear rail is located on the first side of the base. The second linear rail is located on the second side of the first magnet backplane, and the first linear motor, the second linear motor, a first linear rail, and the second linear rail are arranged parallel to each other. The ball screw is disposed on the second side of the first magnet backplane and includes a screw and a nut screwed together. Moreover, the screw is connected to the first magnet backplane that is coupled to the first linear rail, and the nut is connected to the second magnet backplane and coupled to the second linear rail. When the screw is driven by the first linear motor to move along the first linear rail, the linear-rotary actuator provides linear motion output; whereas when the nut is driven by the second linear motor to move along the second linear rail, the linear-rotary actuator provides rotary motion output.

In some embodiments, the first coil assembly is located on the first side of the base. The first magnet backplane is on the first side of the base and movable with respect to the first coil assembly. The second coil assembly is located on the second side of the first magnet backplane. The second magnet backplane is on the second side of the first magnet backplane and movable with respect to the second coil assembly.

In some embodiments, the linear-rotary actuator further includes a first linear slide block and a second linear slide block. The first magnet backplane is coupled to the first linear rail via the first linear slide block. The nut and the second magnet backplane are coupled to the second linear rail via the second linear slide block.

In some embodiments, the linear-rotary actuator further includes a third linear rail, a fourth linear rail, a third linear slide block, and a fourth linear slide block. The third and fourth linear rails are respectively located on the first side of the base and the second side of the first magnet backplane and parallel to each other. Moreover, the third linear rail is located on a side of the first coil assembly opposite the first linear rail, and the fourth linear rail is located on a side of the second coil assembly opposite the second linear rail. The first magnet backplane is coupled to the third linear rail via the third linear slide block. The second magnet backplane is coupled to the fourth linear rail via the fourth linear slide block.

In some embodiments, the third and fourth linear rails are parallel to the first linear rail, the second linear rail, the first linear motor, and the second linear motor.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
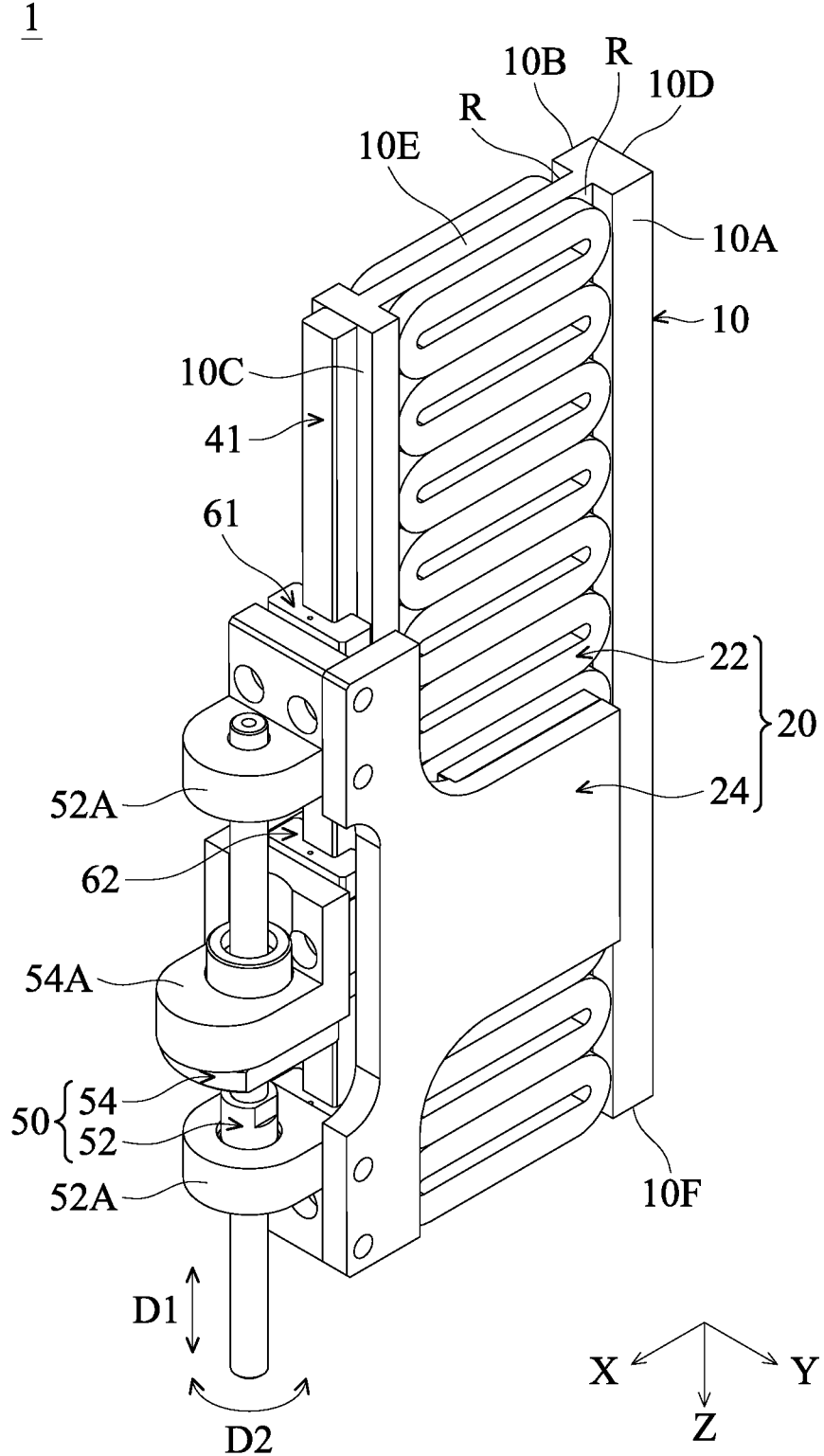
FIG. 1 is a schematic perspective view of a linear-rotary actuator in accordance with a first embodiment of the invention.
Figure 2:
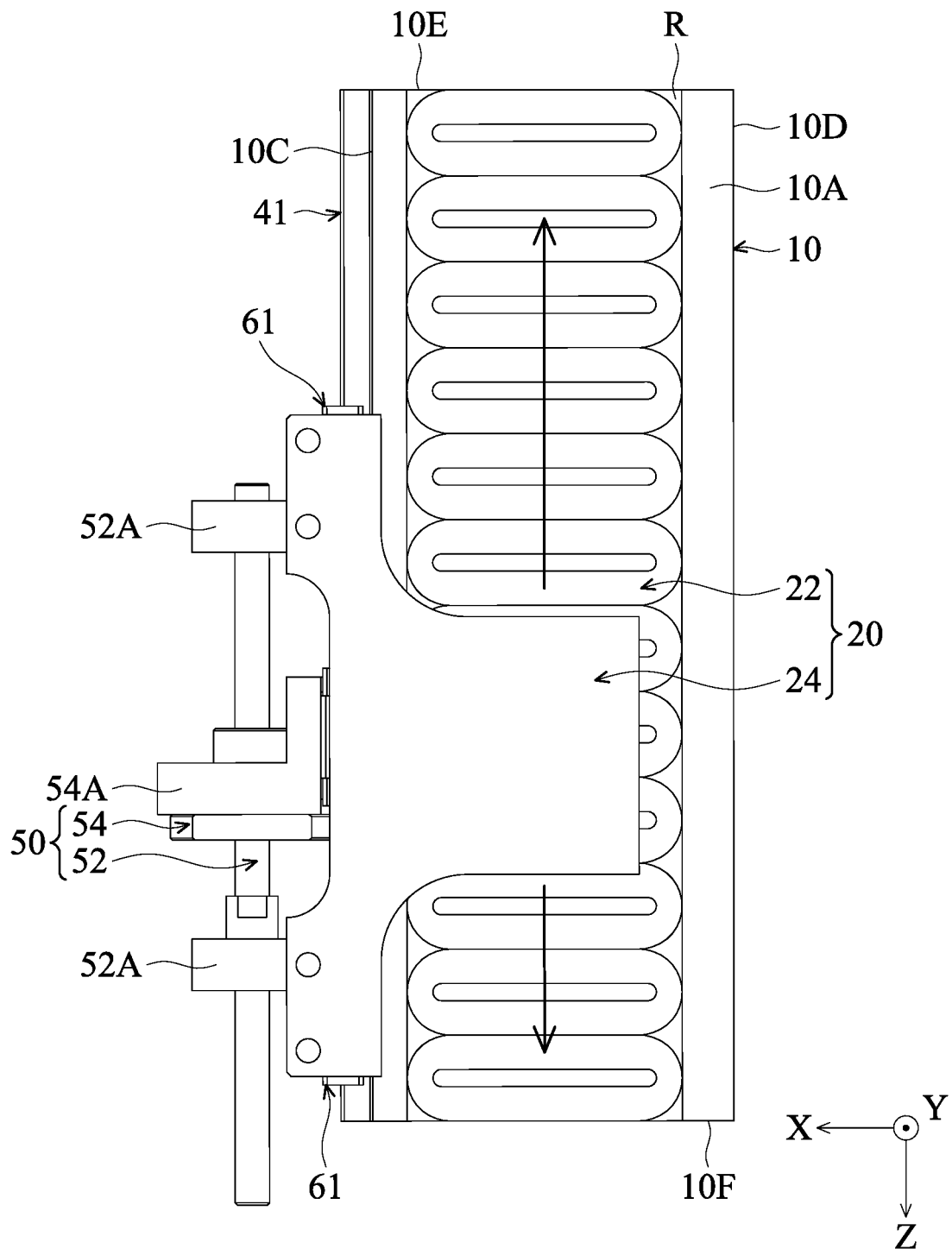
FIGS. 2 to 4 are schematic side views of the linear-rotary actuator in FIG. 1 from different viewing angles.
Figure 3:
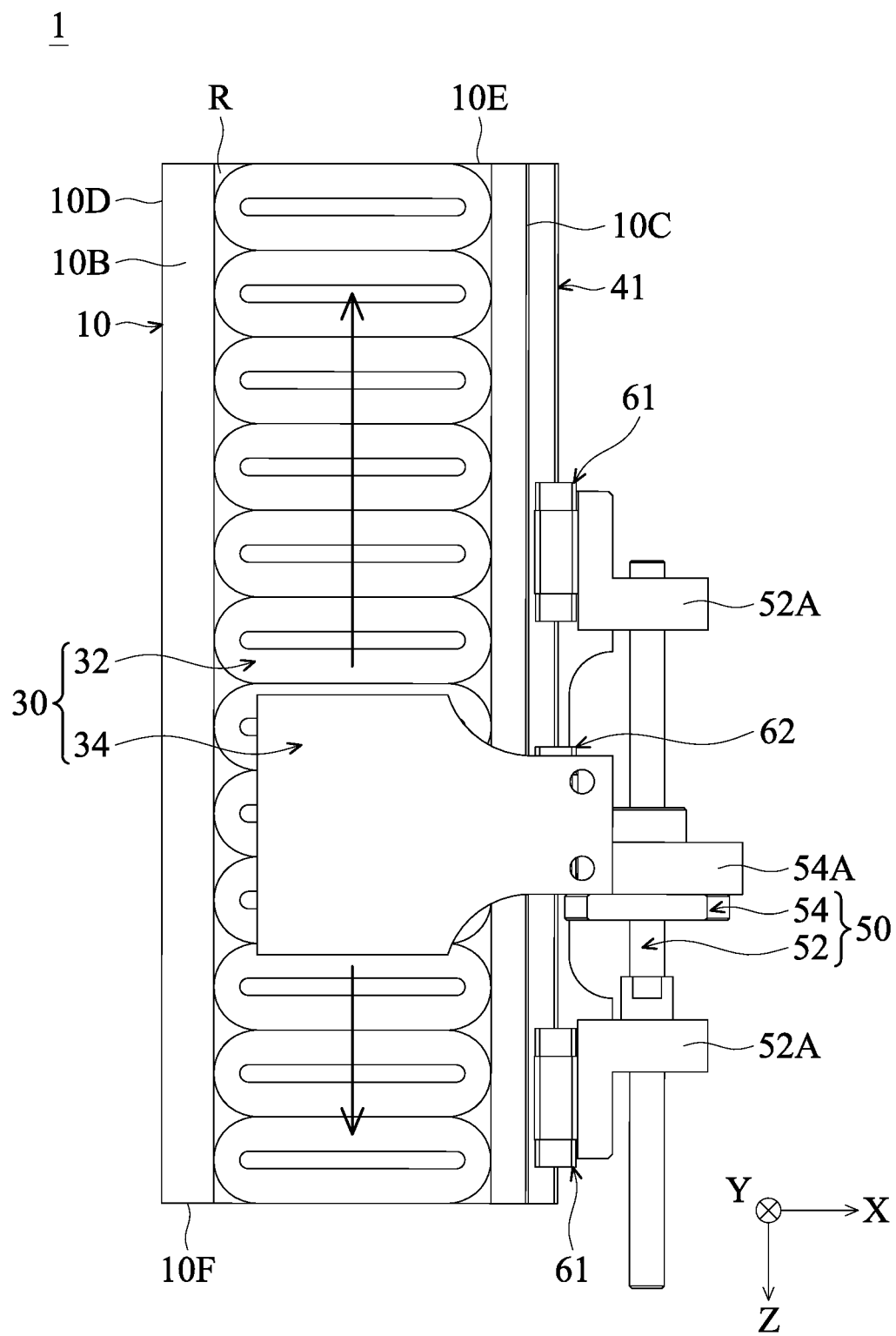

A detailed description is given in the following embodiments with reference to the accompanying drawings.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

First Embodiment

Referring to FIGS. 1 to 4, a linear-rotary actuator 1 in accordance with a first embodiment of the invention includes a base 10, a first linear motor 20, a second linear motor 30, a first linear rail 41, a ball screw 50, two first linear slide blocks 61, and a second linear slide block 62.

Figure 4:
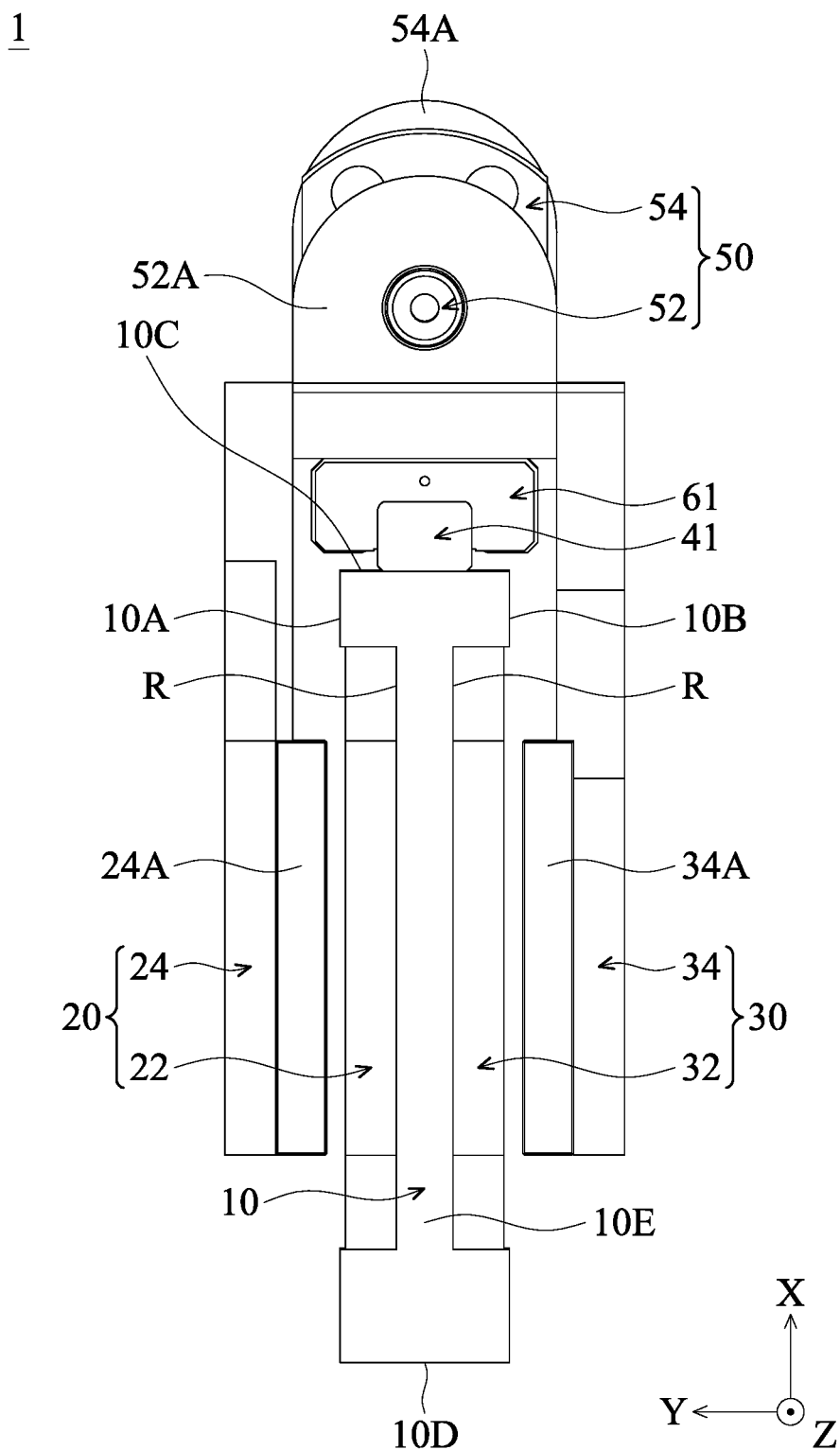

In this embodiment, the base 10 has a long structure. Specifically, the base 10 has a first side 10A and a second side 10B parallel and opposite to each other, wherein the long axes of the first and second sides 10A and 10B are parallel to a Z-axis defined in the drawings. The first and second sides 10A and 10B respectively form a depressed long space R, wherein the long axes of the long spaces R are extended along the Z-axis. Moreover, the base 10 has a third side 10C and a fourth side 10D parallel and opposite to each other and has a fifth side 10E and a sixth side 10F parallel and opposite to each other, wherein the third side to sixth side 10C-10F are respectively between the first and second sides 10A and 10B and perpendicular to the first and second sides 10A and 10B. As shown in FIG. 4, the base 10 is I-shaped when viewed along the Z-axis. In addition, the base 10 can be made of materials with high magnetic permeability (e.g. Nickel, steel, or an iron-nickel alloy).

The first linear motor 20 includes a first coil assembly 22 and a first magnet backplane 24. The first coil assembly 22 is fixed in the long space R on the first side 10A of the base 10 along the Z-axis. The first magnet backplane 24 is movably disposed on the first side 10A of the base 10 and has a first magnet 24A (FIG. 4) located on a side of the first magnet backplane 24 adjacent to the base 10 and corresponding to the first coil assembly 22. By the electromagnetic effect between the first coil assembly 22 and the first magnet backplane 24 (the first magnet 24A), a linear driving force can be generated to drive the first magnet backplane 24 to move linearly along the Z-axis with respect to the first coil assembly 22 (as the arrows indicate in FIG. 2).

Similarly, the second linear motor 30 includes a second coil assembly 32 and a second magnet backplane 34. The second coil assembly 32 is fixed in the long space R on the second side 10B of the base 10 along the Z-axis. The second magnet backplane 34 is movably disposed on the second side 10B of the base 10 and has a second magnet 34A (FIG. 4) located on a side of the second magnet backplane 34 adjacent to the base 10 and corresponding to the second coil assembly 32. By the electromagnetic effect between the second coil assembly 32 and the second magnet backplane 34 (the second magnet 34A), a linear driving force can be generated to drive the second magnet backplane 34 to move linearly along the Z-axis with respect to the second coil assembly 32 (as the arrows indicate in FIG. 3).

The first linear rail 41 is located on the third side 10C of the base 10 along the Z-axis. It should also be realized that the first linear motor 20, the second linear motor 30, and the first linear rail 41 are arranged parallel to each other (parallel to the Z-axis).

The ball screw 50 includes a screw 52 and a nut 54. The screw 52 has at least one support base 52A (there are two support bases 52A in this embodiment) for supporting the main body of the screw 52 and allowing the main body of the screw 52 to rotate around its axial center. The nut 54 is screwed on the screw 52 and has a connecting base 54A.

As shown in FIGS. 1 to 4, the ball screw 50 is disposed on the third side 10C of the base 10. Specifically, the two support bases 52A of the screw 52 are connected to the first magnet backplane 24 and coupled to the first linear rail 41 via the first linear slide block 61, and the connecting base 54A of the nut 54 is connected to the second magnet backplane 34 and coupled to the first linear rail 41 via the second linear slide block 62. Note that the shape of the first and second backplanes 24 and 34 shown in the drawings is for connecting the screw 52 (the support bases 52A) and the nut 54 (the connecting base 54A), but the invention is not limited thereto, and the shape of the first and second backplanes 24 and 34 can be designed according to actual needs.

With the structural designs described above, the screw 52 can be driven by the first linear motor 20 (i.e. when the first magnet backplane 24 moves linearly with respect to the first coil assembly 22) to move along the first linear rail 41, and the nut 54 can be driven by the second linear motor 30 (i.e. when the second magnet backplane 34 moves linearly with respect to the second coil assembly 32) to move along the first linear rail 41.

In particular, when the screw 52 and the nut 54 are respectively driven by the first and second linear motors 20 and 30 to move along the first linear rail 41 in a synchronized manner (i.e. the screw 52 and the nut 54 moves along the first linear rail 41 at the same speed and in the same direction), the linear-rotary actuator 1 can provide linear motion output (as the arrow D1 indicates in FIG. 1). On the other hand, when the nut 54 is driven by the second linear motor 30 to move along the first linear rail 41 in an asynchronous manner with respect to the screw 52 (this situation includes: the screw 52 and the nut 54 are respectively driven by the first and second linear motors 20 and 30 to move along the first linear rail 41 at different speeds or in different directions; or only the nut 54 is driven by the second linear motor 30 (but the screw 52 is not driven by the first linear motor 20) to move along the first linear rail 41 with respect to the screw 52), the nut 54 drives the screw 52 to rotate, so that the linear-rotary actuator 1 can provide rotary motion output (as the arrow D2 indicates in FIG. 1).

Figure 5:
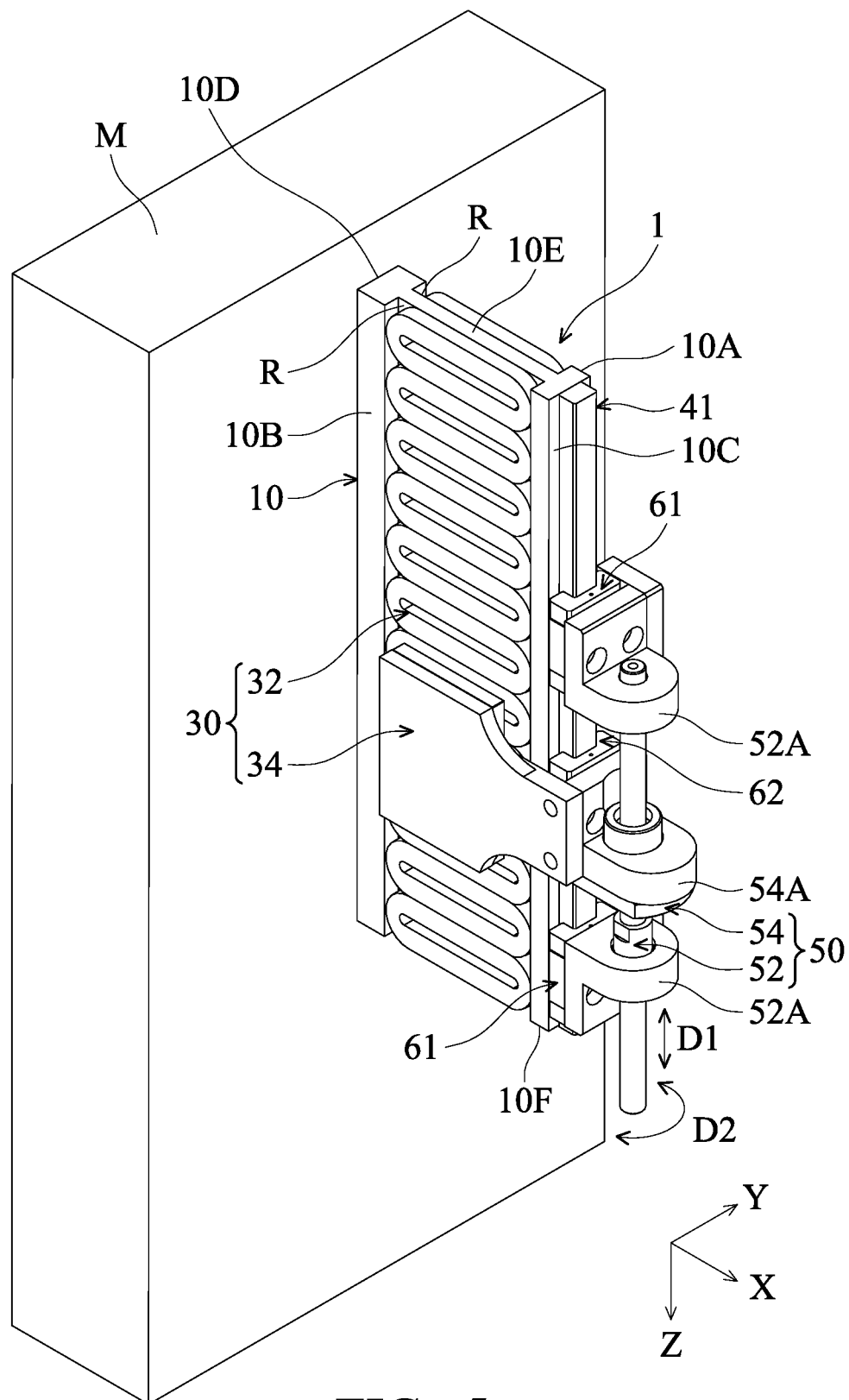
FIG. 5 is a schematic view illustrating the installation method of the linear-rotary actuator in FIG. 1 from another viewing angle.
Figure 6:
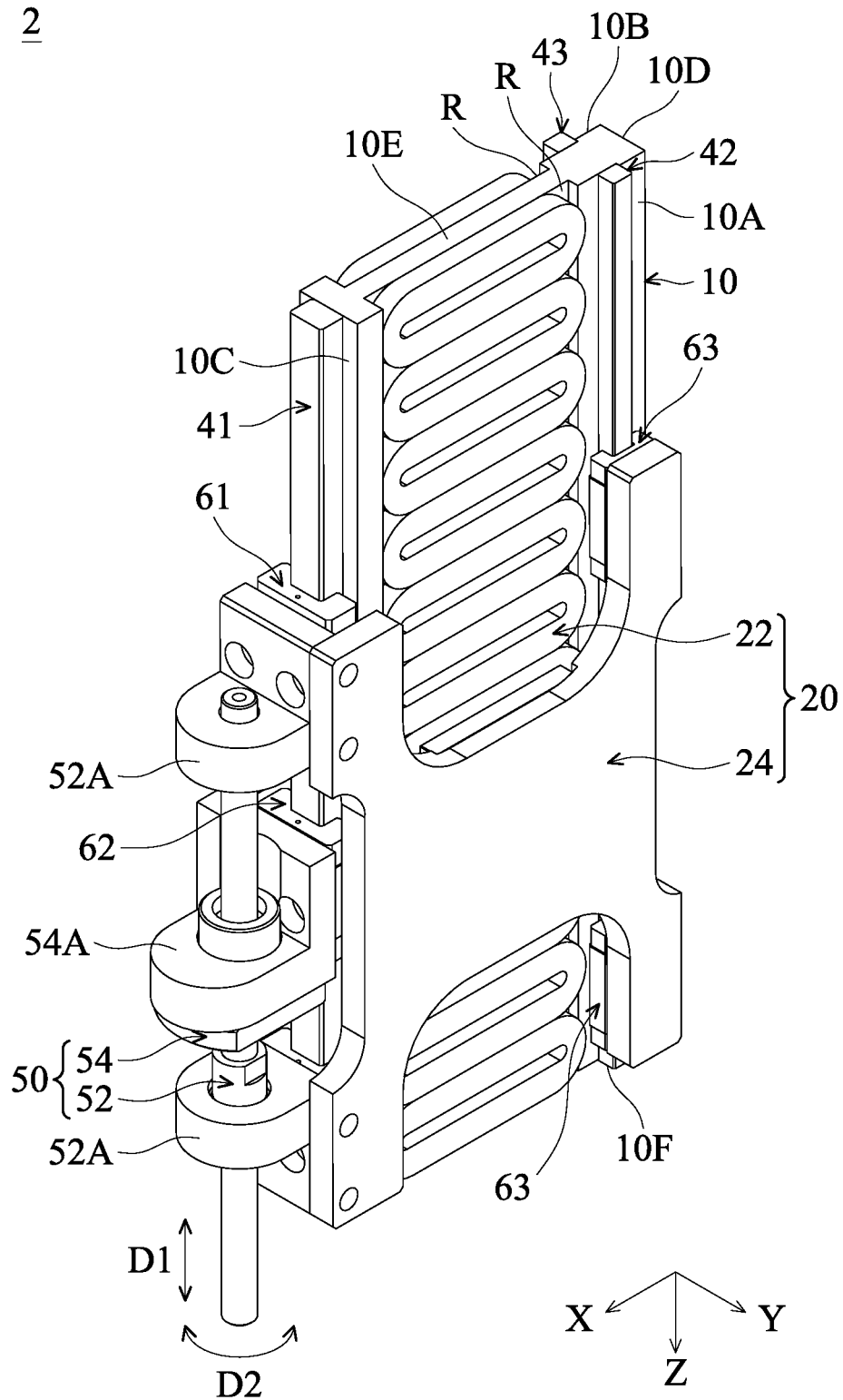
FIG. 6 is a schematic perspective view of a linear-rotary actuator in accordance with a second embodiment of the invention.
Figure 7:
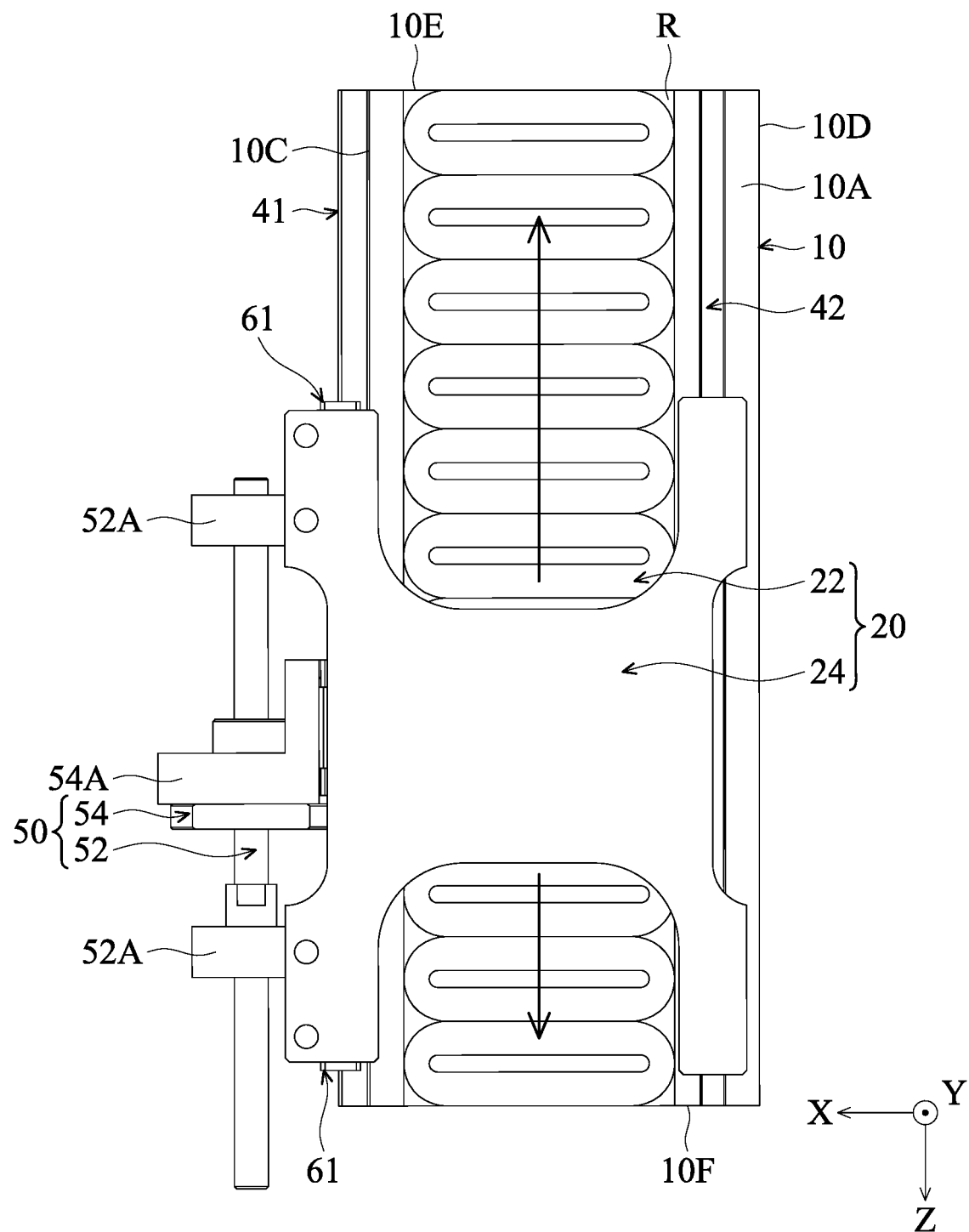
FIGS. 7 to 9 are schematic side views of the linear-rotary actuator in FIG. 6 from different viewing angles.
Figure 8:
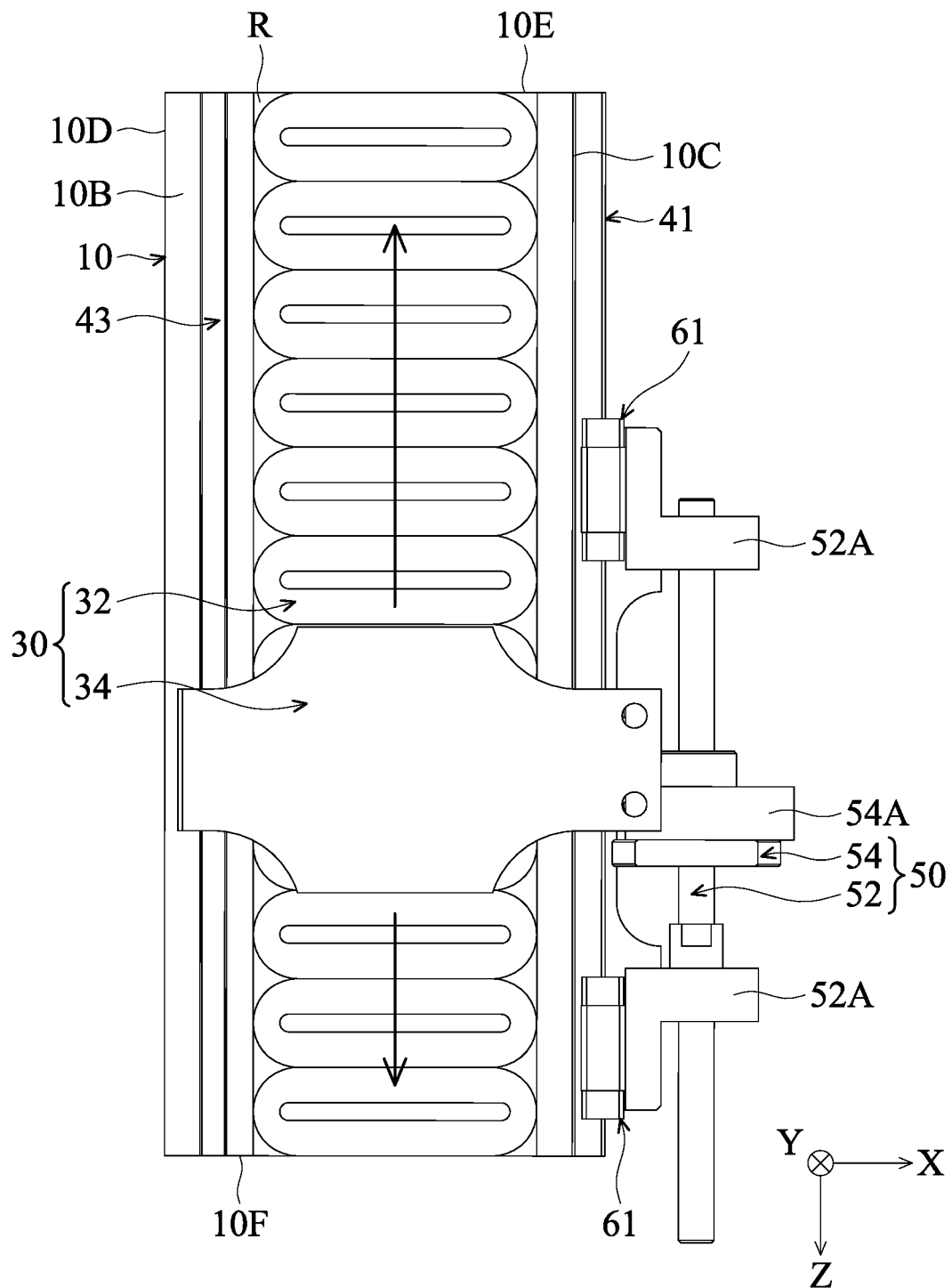
Figure 9:
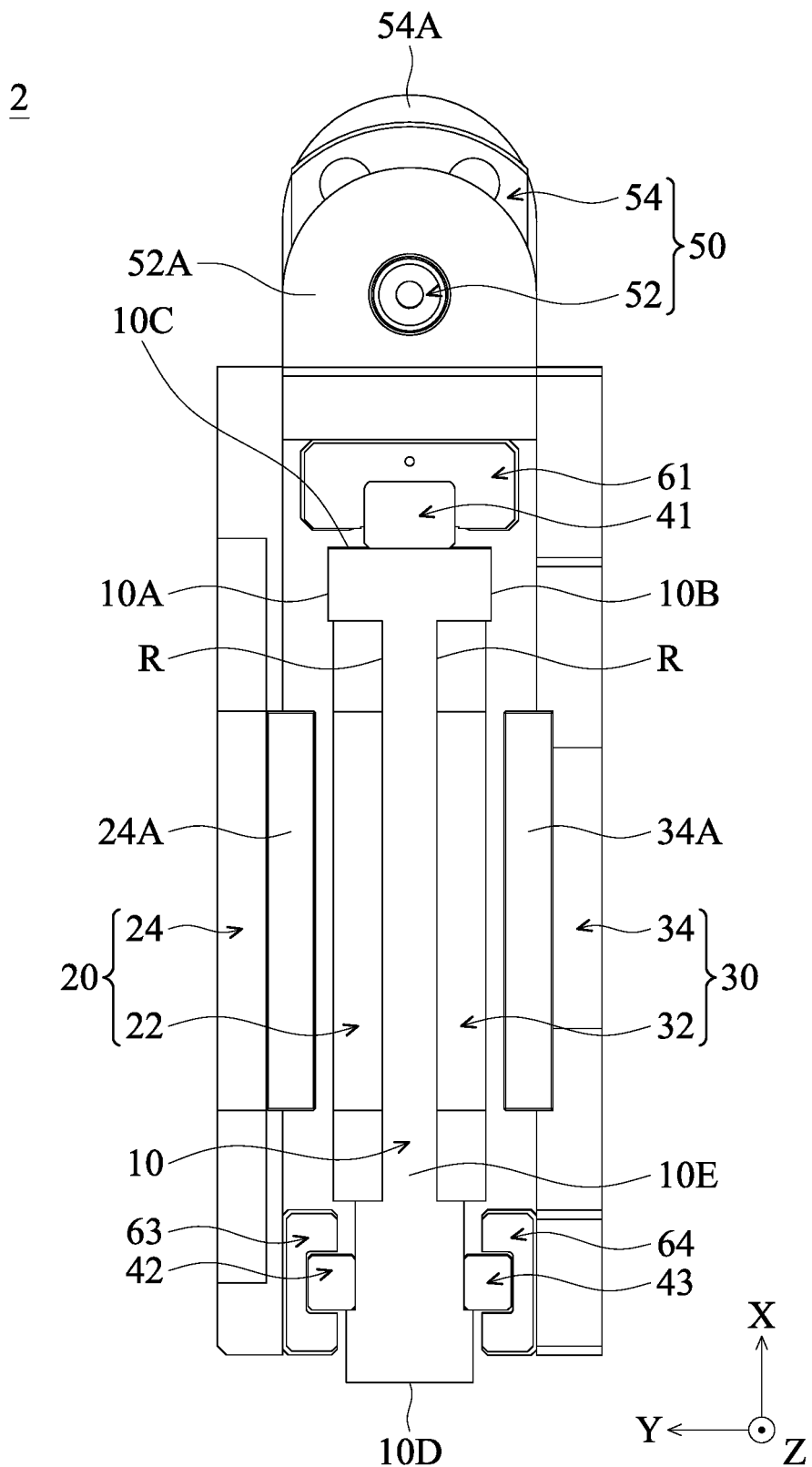

As described above, the linear-rotary actuator 1 can provide linear and/or rotary motion outputs and thus is suitable for various applications. Moreover, since no additional servo rotary motor is required, the linear-rotary actuator 1 can solve the problems of the conventional linear-rotary actuator caused by using servo rotary motors. Referring to FIG. 5, in using the linear-rotary actuator 1, the fourth side 10D of the base 10 can be installed on a process equipment's mounting portion M which is parallel to the Z-axis, so that the linear-rotary actuator 1 can provide linear and rotary motion outputs along or around the Z-axis.

Second Embodiment

Referring to FIGS. 6 to 9, a linear-rotary actuator 2 in accordance with a second embodiment of the invention includes a base 10, a first linear motor 20, a second linear motor 30, a first linear rail 41, a second linear rail 42, a third linear rail 43, a ball screw 50, two first linear slide blocks 61, a second linear slide block 62, two third linear slide blocks 63, and a fourth linear slide block 64.

The linear-rotary actuator 2 differs from the linear-rotary actuator 1 of the first embodiment (FIGS. 1 to 5) in that the linear-rotary actuator 2 further includes a second linear rail 42, a third linear rail 43, third linear slide blocks 63, and a fourth linear slide block 64. Thus, only these elements will be illustrated further in the following paragraphs.

As shown in FIGS. 6 to 9, the second and third linear rails 42 and 43 are respectively located on the first side 10A and the second side 10B of the base 10 along the Z-axis and adjacent to the fourth side 10D of the base 10. In other words, the second linear rail 42, the third linear rail 43, the first linear motor 20, the second linear motor 30, and the first linear rail 41 are parallel to each other.

In this embodiment, the first magnet backplane 24 of the first linear motor 20 is further coupled to the second linear rail 42 via the third linear slide block 63, and the second magnet backplane 34 of the second linear motor 30 is further coupled to the third linear rail 43 via the fourth linear slide block 64. Accordingly, the stability and smoothness of the first and second magnet backplanes 24 and 34 while moving linearly can be increased further. Note that the shape of the first and second backplanes 24 and 34 shown in the drawings is for connecting the screw 52 (the support bases 52A), the nut 54 (the connecting base 54A), the third linear slide blocks 63, and the fourth linear slide block 64, but the invention is not limited thereto, and the shape of the first and second backplanes 24 and 34 can be designed according to actual needs.

Figure 10:
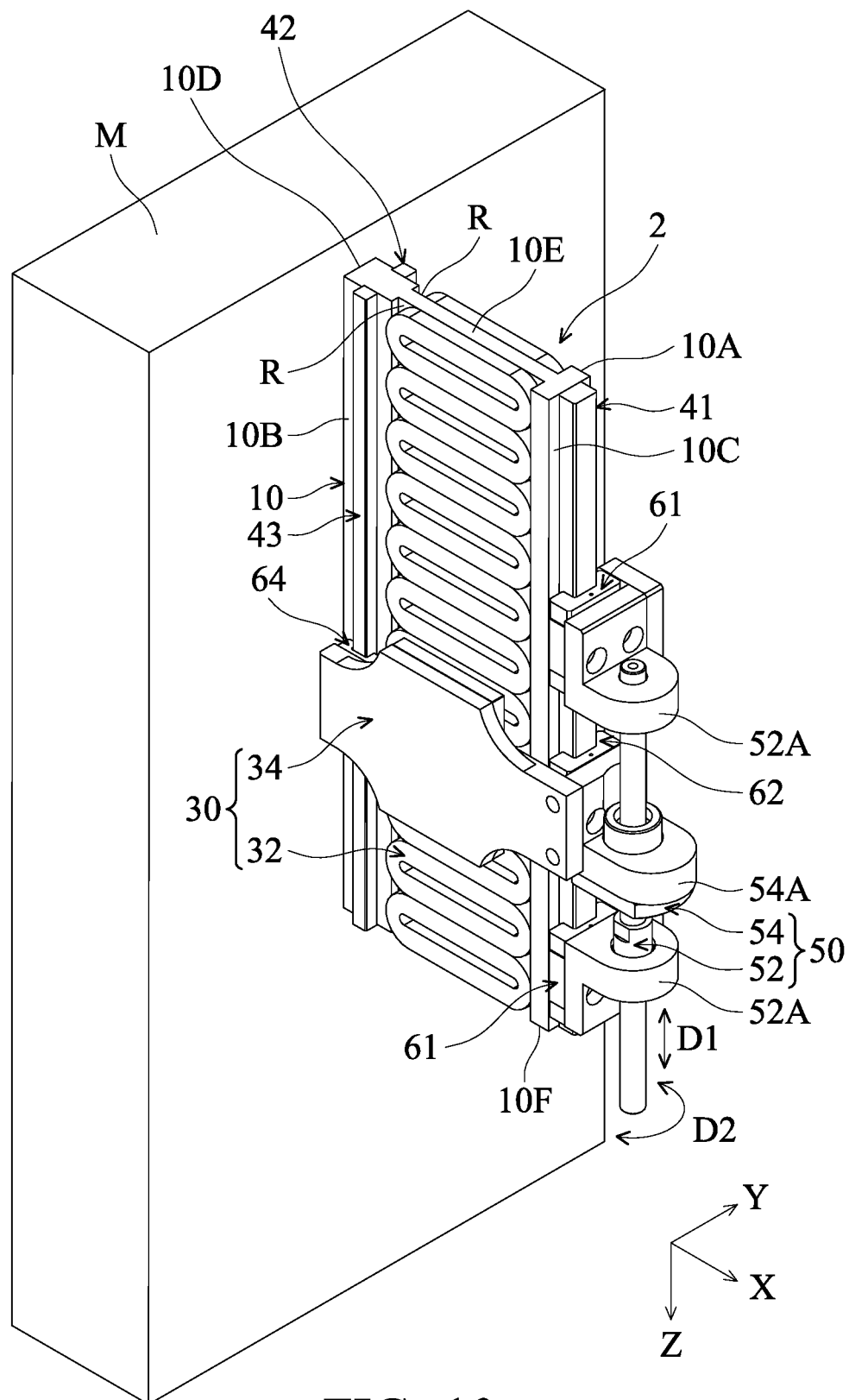
FIG. 10 is a schematic view illustrating the installation method of the linear-rotary actuator in FIG. 6 from another viewing angle.
Figure 11:
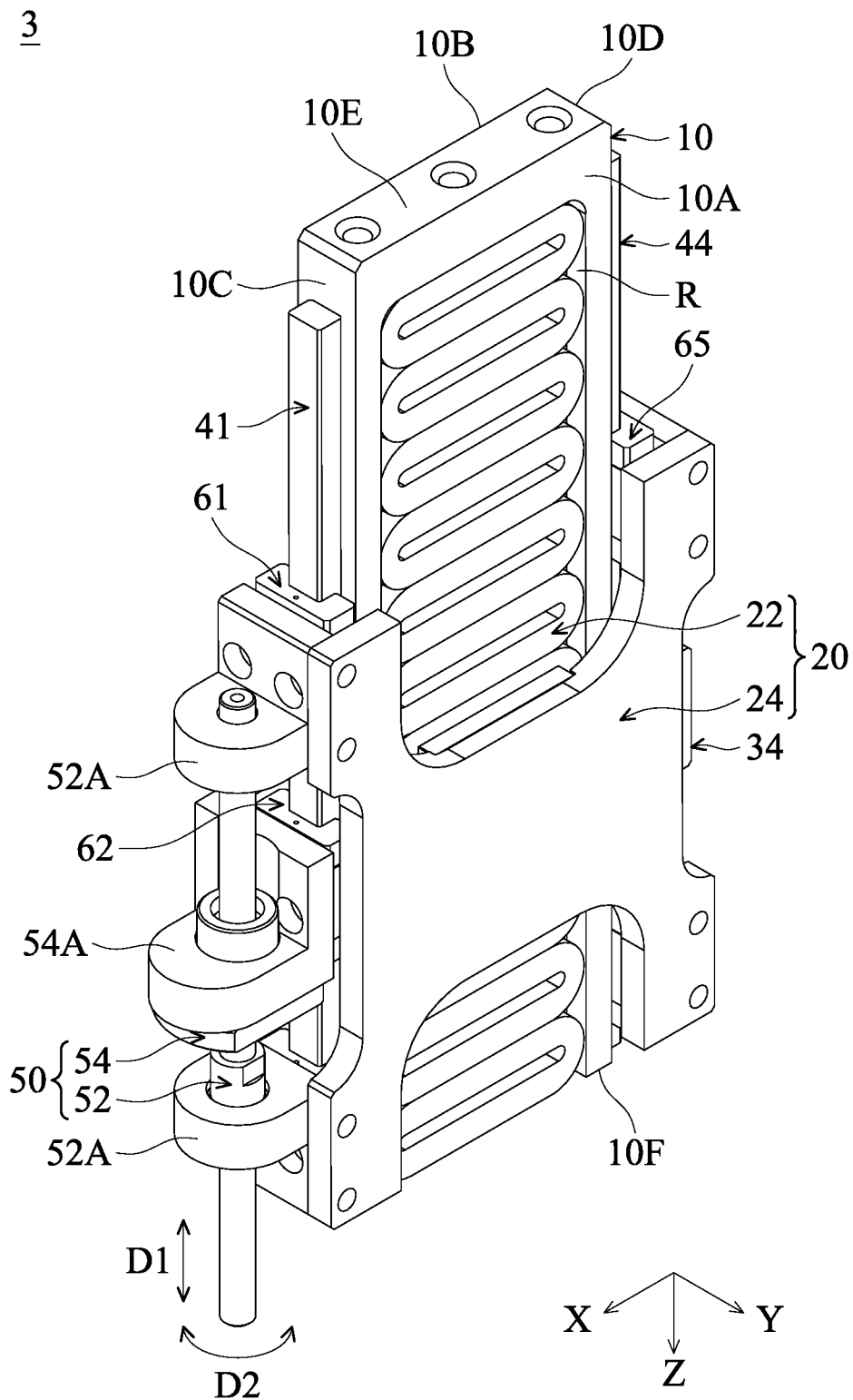
FIG. 11 is a schematic perspective view of a linear-rotary actuator in accordance with a third embodiment of the invention.
Figure 12:
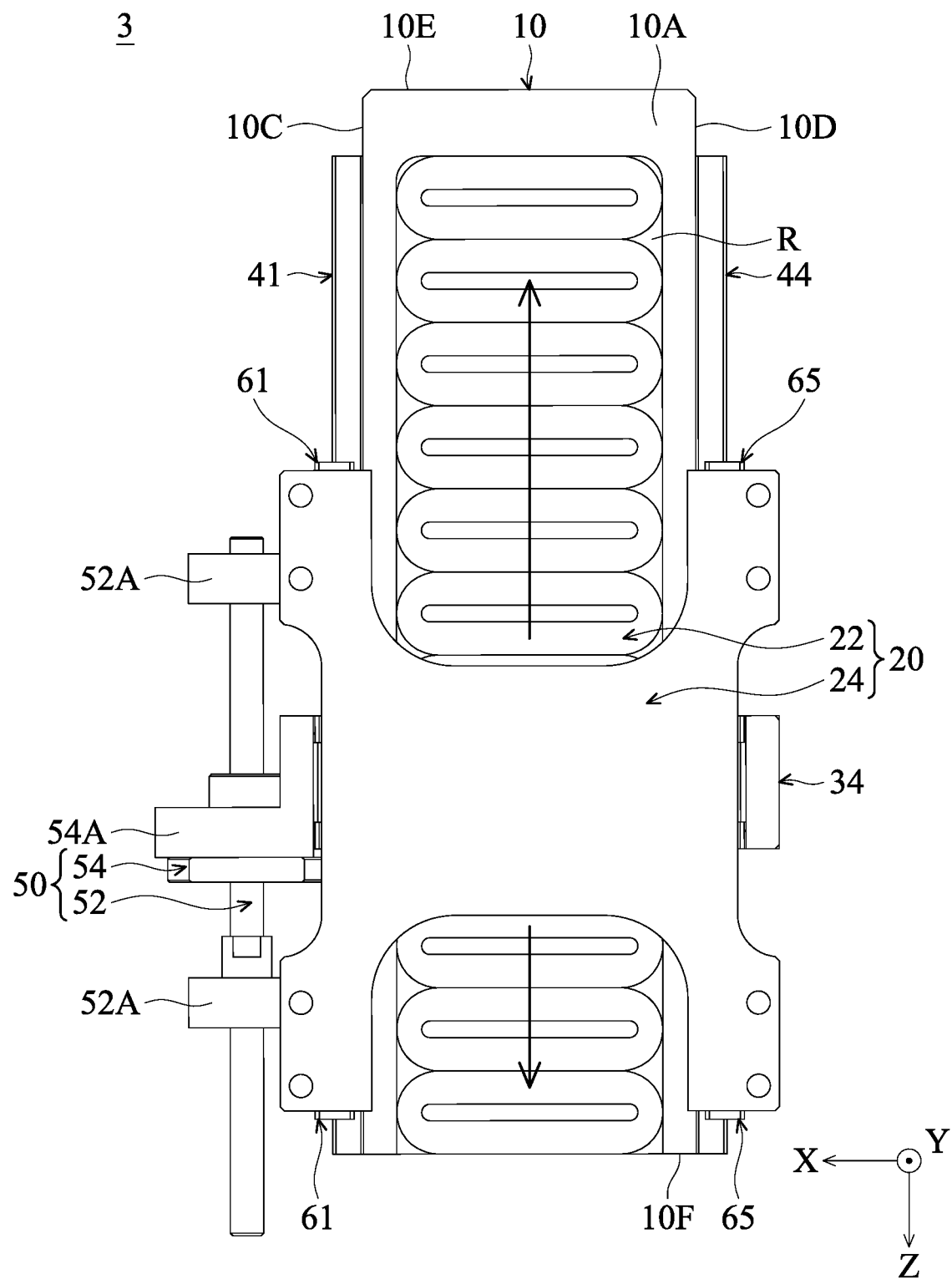
FIGS. 12 to 14 are schematic side views of the linear-rotary actuator in FIG. 11 from different viewing angles.
Figure 13:
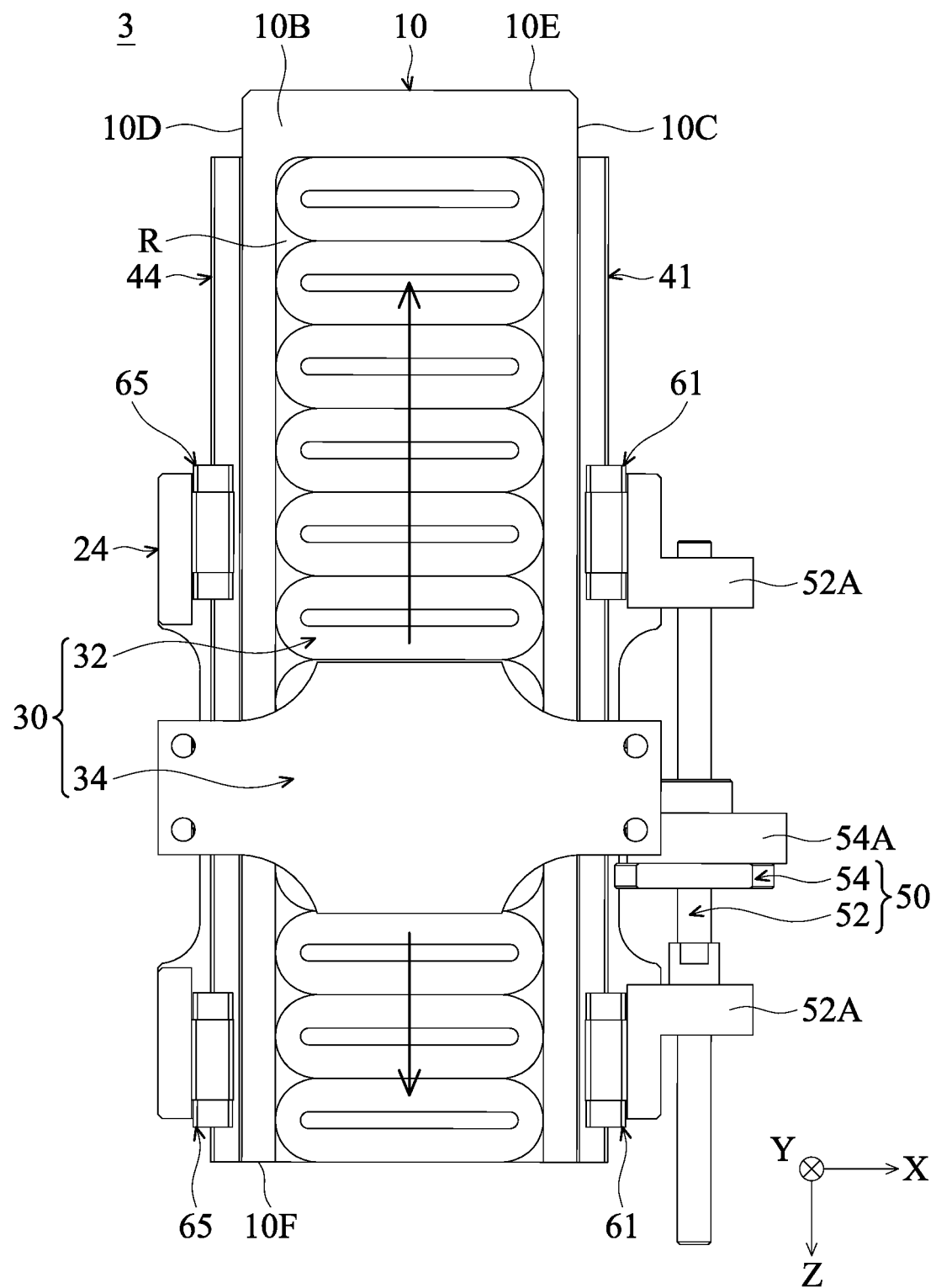
Figure 14:
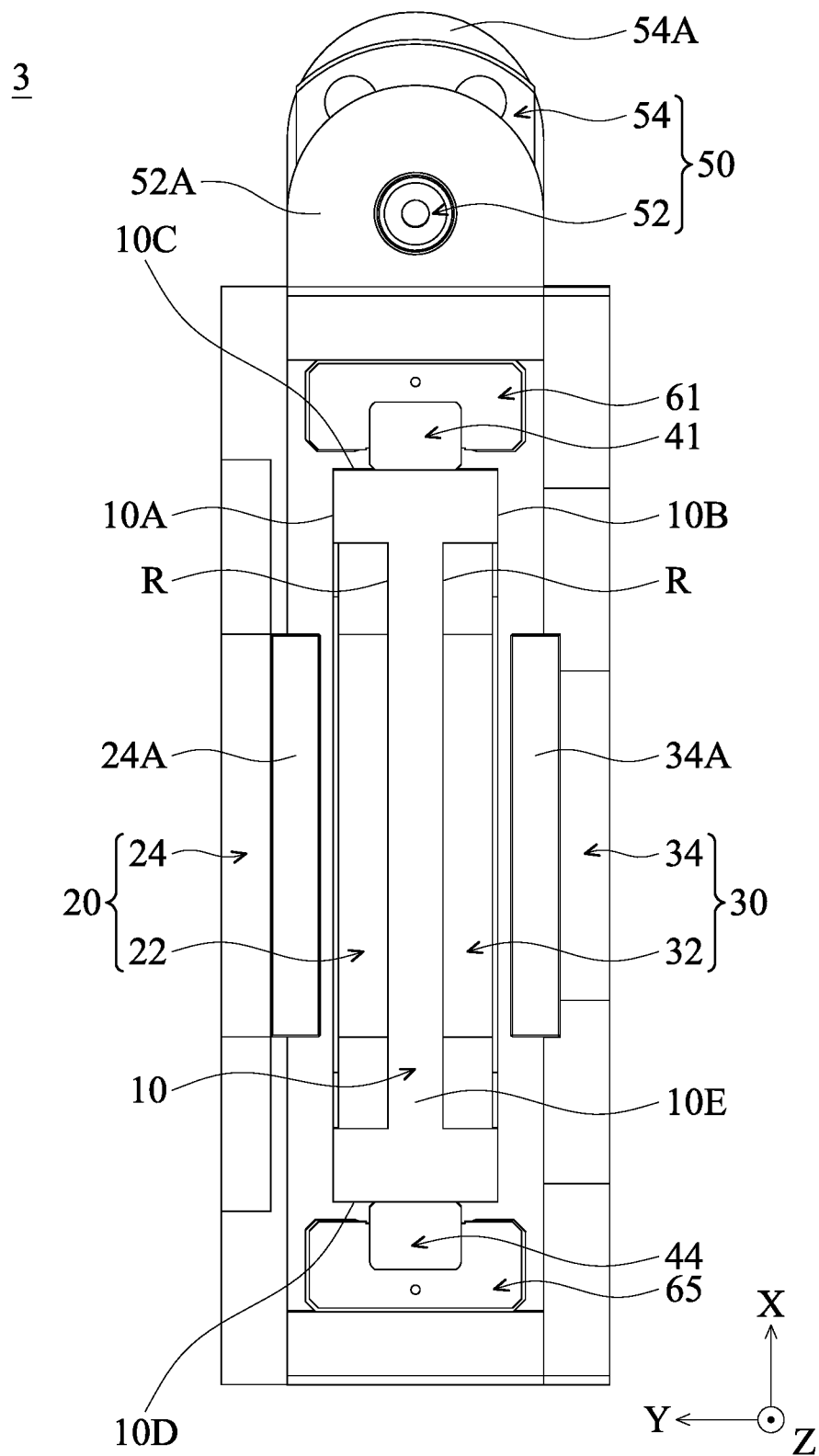

With the structural designs described above, the linear-rotary actuator 2 can also provide linear and/or rotary motion outputs and thus is suitable for various applications. Moreover, since no additional servo rotary motor is required, the linear-rotary actuator 2 can solve the problems of the conventional linear-rotary actuator caused by using servo rotary motors. Referring to FIG. 10, in using the linear-rotary actuator 2, the fourth side 10D of the base 10 can be installed on a process equipment's mounting portion M which is parallel to the Z-axis, so that the linear-rotary actuator 2 can provide linear and rotary motion outputs along or around the Z-axis.

Third Embodiment

Referring to FIGS. 11 to 14, a linear-rotary actuator 3 in accordance with a third embodiment of the invention includes a base 10, a first linear motor 20, a second linear motor 30, a first linear rail 40, a fourth linear rail 44, a ball screw 50, two first linear slide blocks 61, a second linear slide block 62, two fifth linear slide blocks 65, and a sixth linear slide block 66.

The linear-rotary actuator 3 differs from the linear-rotary actuator 1 of the first embodiment (FIGS. 1 to 5) in that the linear-rotary actuator 3 further includes a fourth linear rail 44, fifth linear slide blocks 65, and a sixth linear slide block 66. Thus, only these elements will be illustrated further in the following paragraphs.

As shown in FIGS. 11 to 14, the fourth linear rail 44 is located on the fourth side 10D of the base 10 along the Z-axis. In other words, the fourth linear rail 44, the first linear motor 20, the second linear motor 30, and the first linear rail 41 are parallel to each other.

In this embodiment, a part of the first magnet backplane 24 of the first linear motor 20 is extended to the fourth side 10D of the base 10 and further coupled to the fourth linear rail 44 via the fifth linear slide blocks 65, and a part of the second magnet backplane 34 of the second linear motor 30 is also extended to the fourth side 10D of the base 10 and further coupled to the fourth linear rail 44 via the sixth linear slide block 66. Accordingly, the stability and smoothness of the first and second magnet backplanes 24 and 34 while moving linearly can be increased further. Note that the shape of the first and second backplanes 24 and 34 shown in the drawings is for connecting the screw 52 (the support bases 52A), the nut 54 (the connecting base 54A), the fifth linear slide blocks 65, and the sixth linear slide block 66, but the invention is not limited thereto, and the shape of the first and second backplanes 24 and 34 can be designed according to actual needs.

Figure 15:
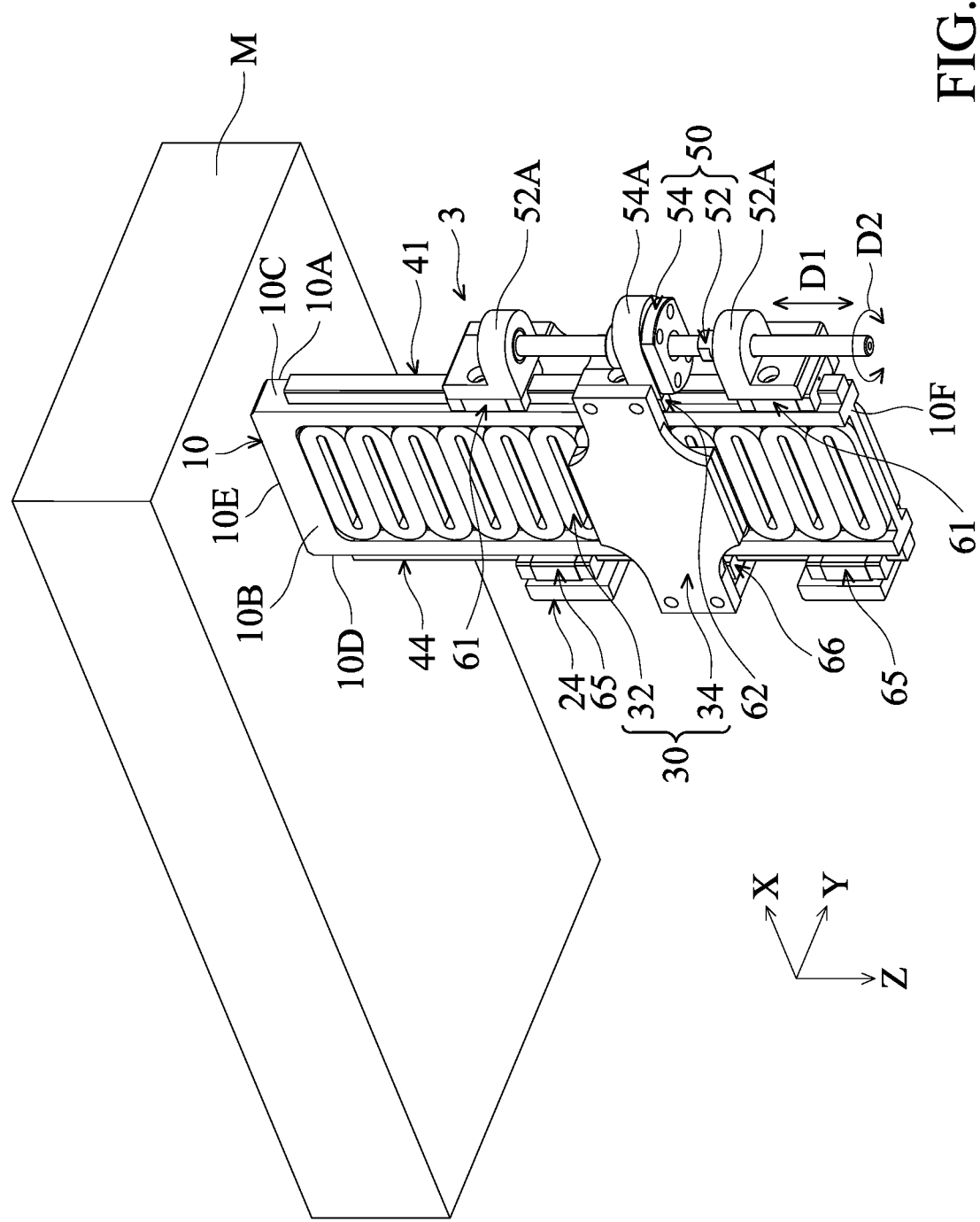
FIG. 15 is a schematic view illustrating the installation method of the linear-rotary actuator in FIG. 11 from another viewing angle.

With the structural designs described above, the linear-rotary actuator 3 can also provide linear and/or rotary motion outputs and thus is suitable for various applications. Moreover, since no additional servo rotary motor is required, the linear-rotary actuator 3 can solve the problems of the conventional linear-rotary actuator caused by using servo rotary motors. Referring to FIG. 15, in using the linear-rotary actuator 3, the fifth side 10E of the base 10 can be installed on a process equipment's mounting portion M which is perpendicular to the Z-axis, so that the linear-rotary actuator 3 can provide linear and rotary motion outputs along or around the Z-axis.

Fourth Embodiment

Figure 16:
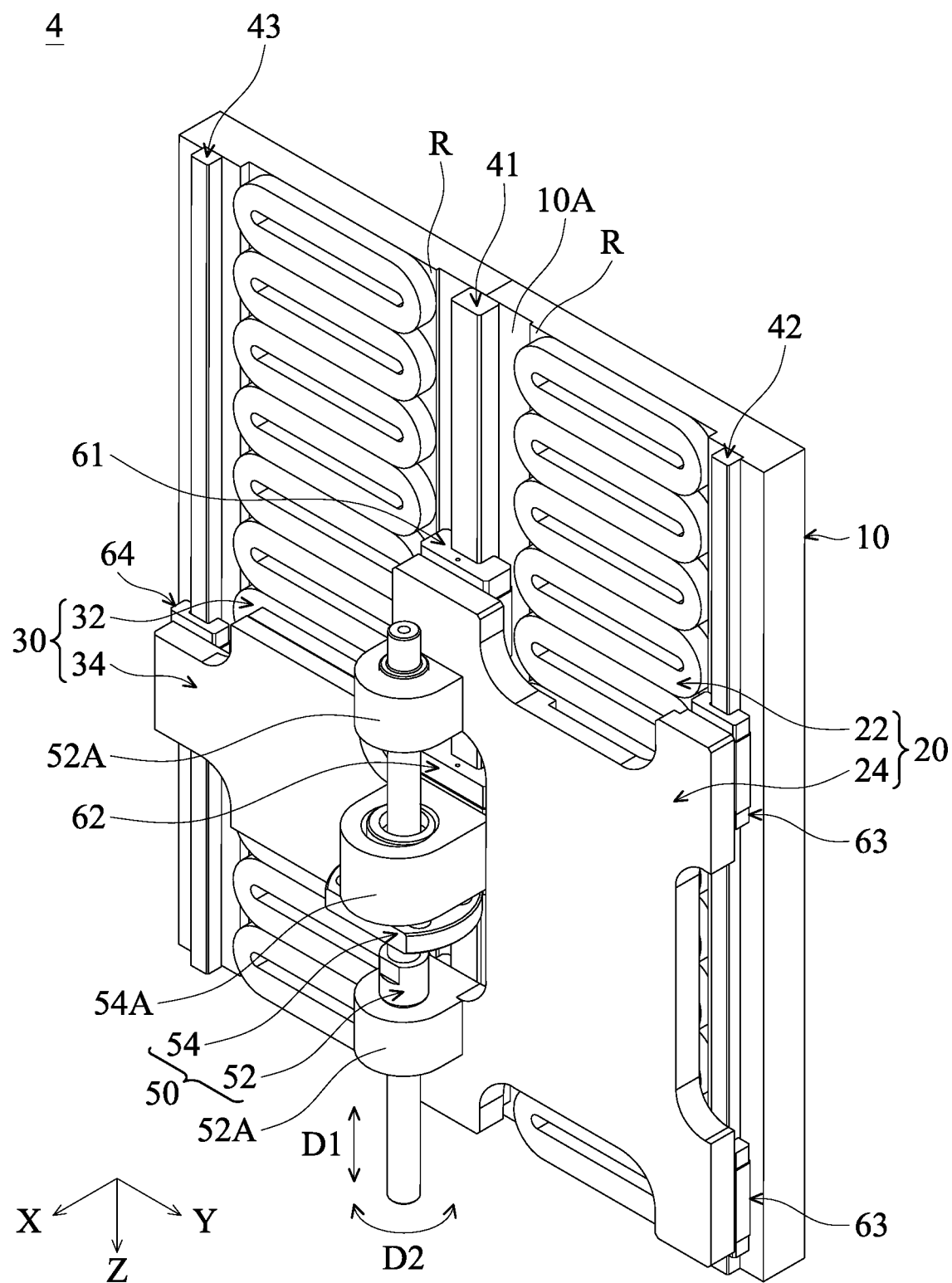
FIG. 16 is a schematic perspective view of a linear-rotary actuator in accordance with a fourth embodiment of the invention.
Figure 17:
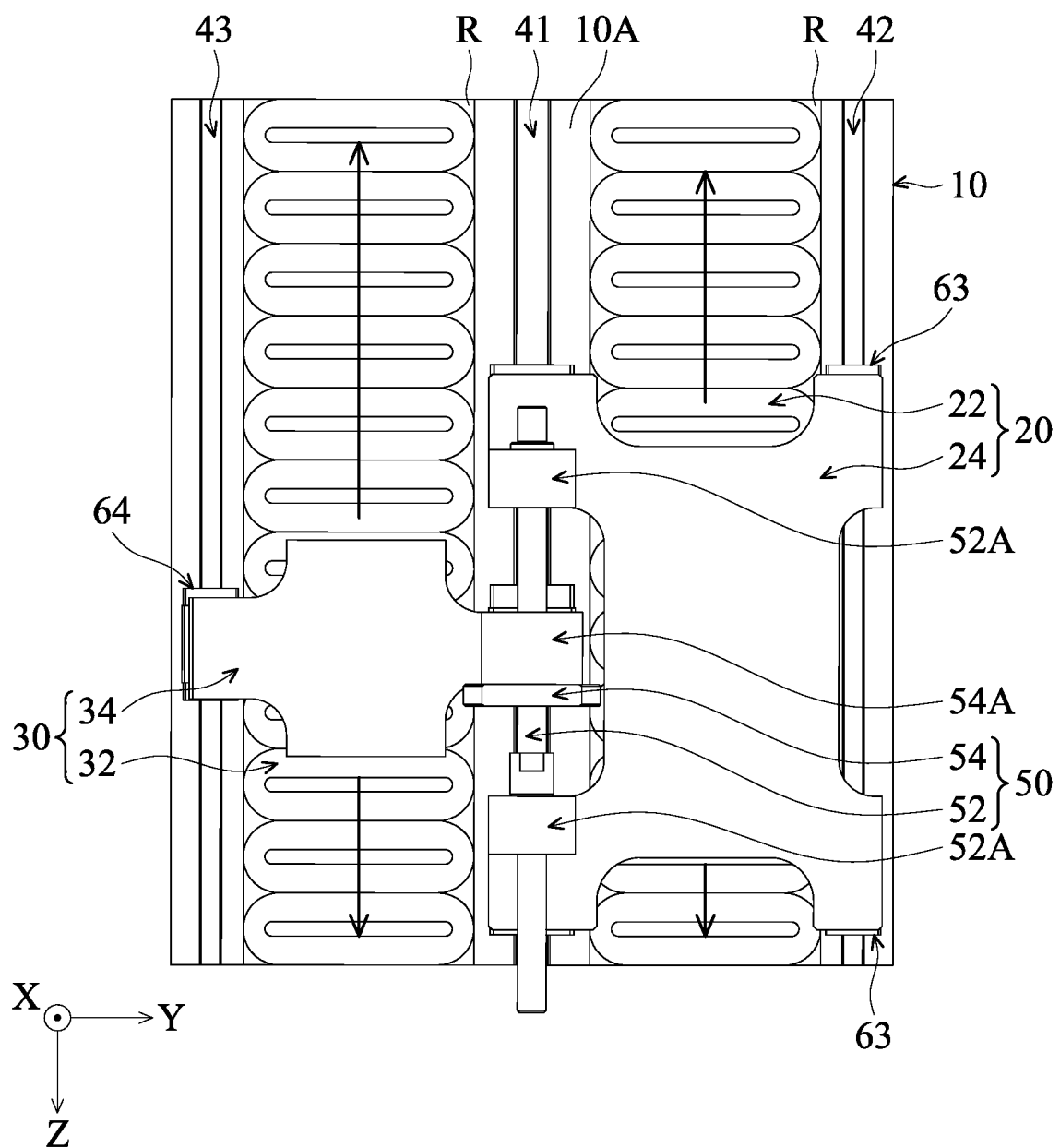
FIGS. 17 to 18 are schematic side views of the linear-rotary actuator in FIG. 16 from different viewing angles.
Figure 18:
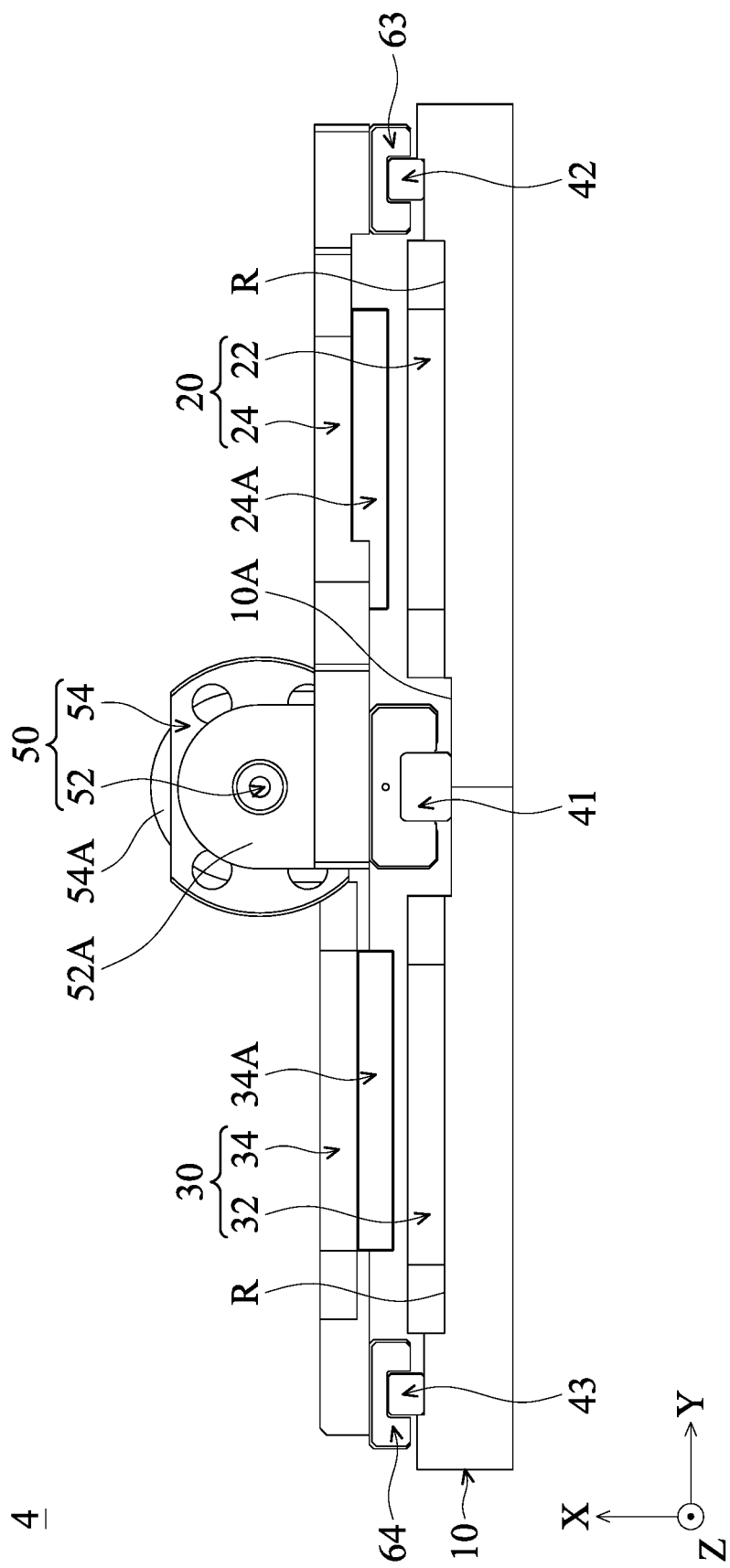

Referring to FIGS. 16 to 18, a linear-rotary actuator 4 in accordance with a fourth embodiment of the invention includes a base 10, a first linear motor 20, a second linear motor 30, a first linear rail 41, a second linear rail 42, a third linear rail 43, a ball screw 50, two first linear slide blocks 61, a second linear slide block 62, two third linear slide blocks 63, and a fourth linear slide block 64.

In this embodiment, the base 10 has a flat plate structure. Specifically, a first side 10A of the base 10 forms two depressed long spaces R, wherein the long axes of the long spaces R are extended along a Z-axis defined in the drawings. In addition, the base 10 can be made of materials with high magnetic permeability (e.g. Nickel, steel, or an iron-nickel alloy).

The first linear motor 20 includes a first coil assembly 22 and a first magnet backplane 24. The first coil assembly 22 is fixed in one long space R on the first side 10A of the base 10 along the Z-axis. The first magnet backplane 24 is movably disposed on the first side 10A of the base 10 and has a first magnet 24A (FIG. 18) located on a side of the first magnet backplane 24 adjacent to the base 10 and corresponding to the first coil assembly 22. The same as the embodiments described above, the first magnet backplane 24 can move linearly along the Z-axis with respect to the first coil assembly 22 (as the arrows indicate in FIG. 17).

Similarly, the second linear motor 30 includes a second coil assembly 32 and a second magnet backplane 34. The second coil assembly 32 is fixed in the other long space R on the first side 10A of the base 10 along the Z-axis. The second magnet backplane 34 is movably disposed on the first side 10A of the base 10 and has a second magnet 34A (FIG. 18) located on a side of the second magnet backplane 34 adjacent to the base 10 and corresponding to the second coil assembly 32. The same as the embodiments described above, the second magnet backplane 34 can move linearly along the Z-axis with respect to the second coil assembly 32 (as the arrows indicate in FIG. 17).

The first linear rail 41 is located on the first side 10A of the base 10 along the Z-axis and between the first coil assembly 22 and the second coil assembly 32. The second linear rail 42 is positioned on the first side 10A of the base 10 along the Z-axis and located on a side of the first coil assembly 22 opposite the first linear rail 41. The third linear rail 43 is positioned on the first side 10A of the base 10 along the Z-axis and located on a side of the second coil assembly 32 opposite the first linear rail 41. It should also be realized that the first linear motor 20, the second linear motor 30, the first linear rail 41, the second linear rail 42, and the third linear rail 43 are arranged parallel to each other (parallel to the Z-axis).

The ball screw 50 includes a screw 52 and a nut 54. The screw 52 has at least one support base 52A (there are two support bases 52A in this embodiment) for supporting the main body of the screw 52 and allowing the main body of the screw 52 to rotate around its axial center. The nut 54 is screwed on the screw 52 and has a connecting base 54A.

As shown in FIGS. 16 to 18, the ball screw 50 is disposed on the first side 10A of the base 10. Specifically, the two support bases 52A of the screw 52 are connected to the first magnet backplane 24 and coupled to the first linear rail 41 via the first linear slide block 61 (in this embodiment, the first magnet backplane 24 is between the support bases 52A and the first linear slide block 61), and the connecting base 54A of the nut 54 is connected to the second magnet backplane 34 and coupled to the first linear rail 41 via the second linear slide block 62 (in this embodiment, the second magnet backplane 34 is between the connecting base 54A and the second linear slide block 62).

Moreover, the first magnet backplane 24 is further coupled to the second linear rail 42 via the third linear slide blocks 63, and the second magnet backplane 34 is further coupled to the third linear rail 43 via the fourth linear slide block 64. Accordingly, the stability and smoothness of the first and second magnet backplanes 24 and 34 while moving linearly can be increased further. Note that the shape of the first and second backplanes 24 and 34 shown in the drawings is for connecting the screw 52 (the support bases 52A), the nut 54 (the connecting base 54A), the third linear slide blocks 63, and the fourth linear slide block 64, but the invention is not limited thereto, and the shape of the first and second backplanes 24 and 34 can be designed according to actual needs.

With the structural designs described above, when the screw 52 and the nut 54 are respectively driven by the first and second linear motors 20 and 30 to move along the first linear rail 41 in a synchronized manner (i.e. the screw 52 and the nut 54 moves along the first linear rail 41 at the same speed and in the same direction), the linear-rotary actuator 4 can provide linear motion output (as the arrow D1 indicates in FIG. 16). On the other hand, when the nut 54 is driven by the second linear motor 30 to move along the first linear rail 41 in an asynchronous manner with respect to the screw 52 (this situation includes: the screw 52 and the nut 54 are respectively driven by the first and second linear motors 20 and 30 to move along the first linear rail 41 at different speeds or in different directions; or only the nut 54 is driven by the second linear motor 30 (but the screw 52 is not driven by the first linear motor 20) to move along the first linear rail 41 with respect to the screw 52), the nut 54 drives the screw 52 to rotate, so that the linear-rotary actuator 4 can provide rotary motion output (as the arrow D2 indicates in FIG. 16).

The linear-rotary actuator 4 can also provide linear and/or rotary motion outputs and thus is suitable for various applications. Moreover, since no additional servo rotary motor is required, the linear-rotary actuator 4 can solve the problems of the conventional linear-rotary actuator caused by using servo rotary motors.

Fifth Embodiment

Figure 19:
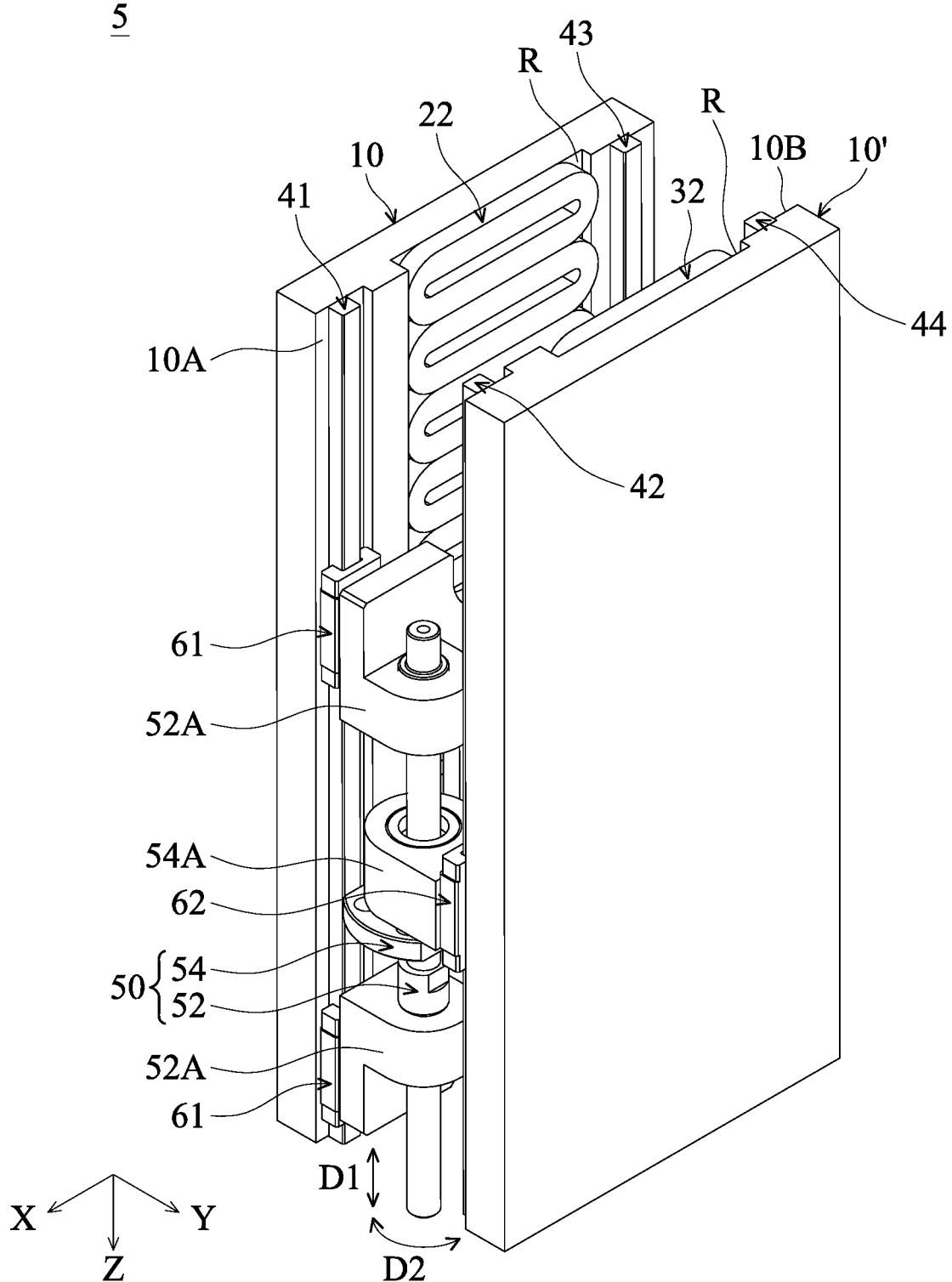
FIG. 19 is a schematic perspective view of a linear-rotary actuator in accordance with a fifth embodiment of the invention.
Figure 20:
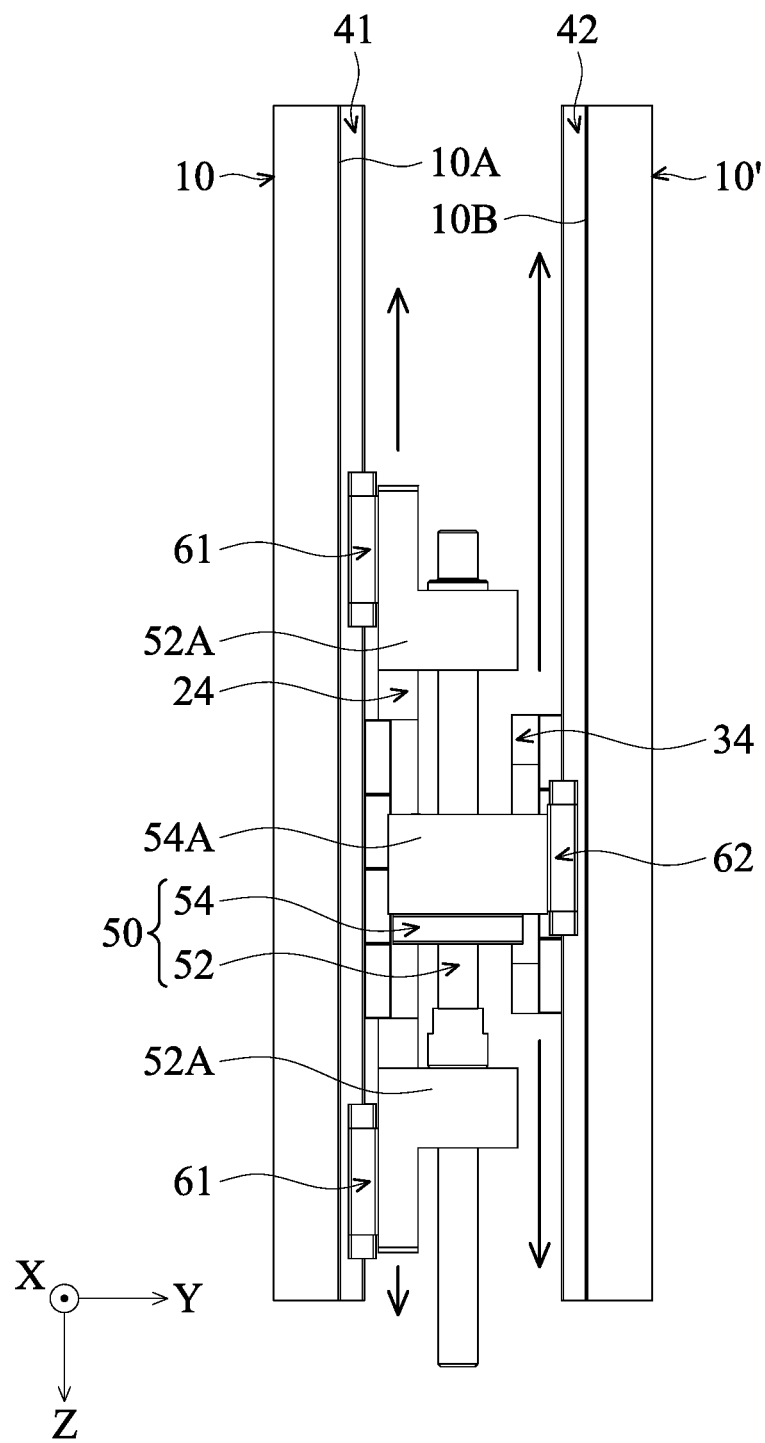
FIGS. 20 to 21 are schematic side views of the linear-rotary actuator in FIG. 19 from different viewing angles.
Figure 21:
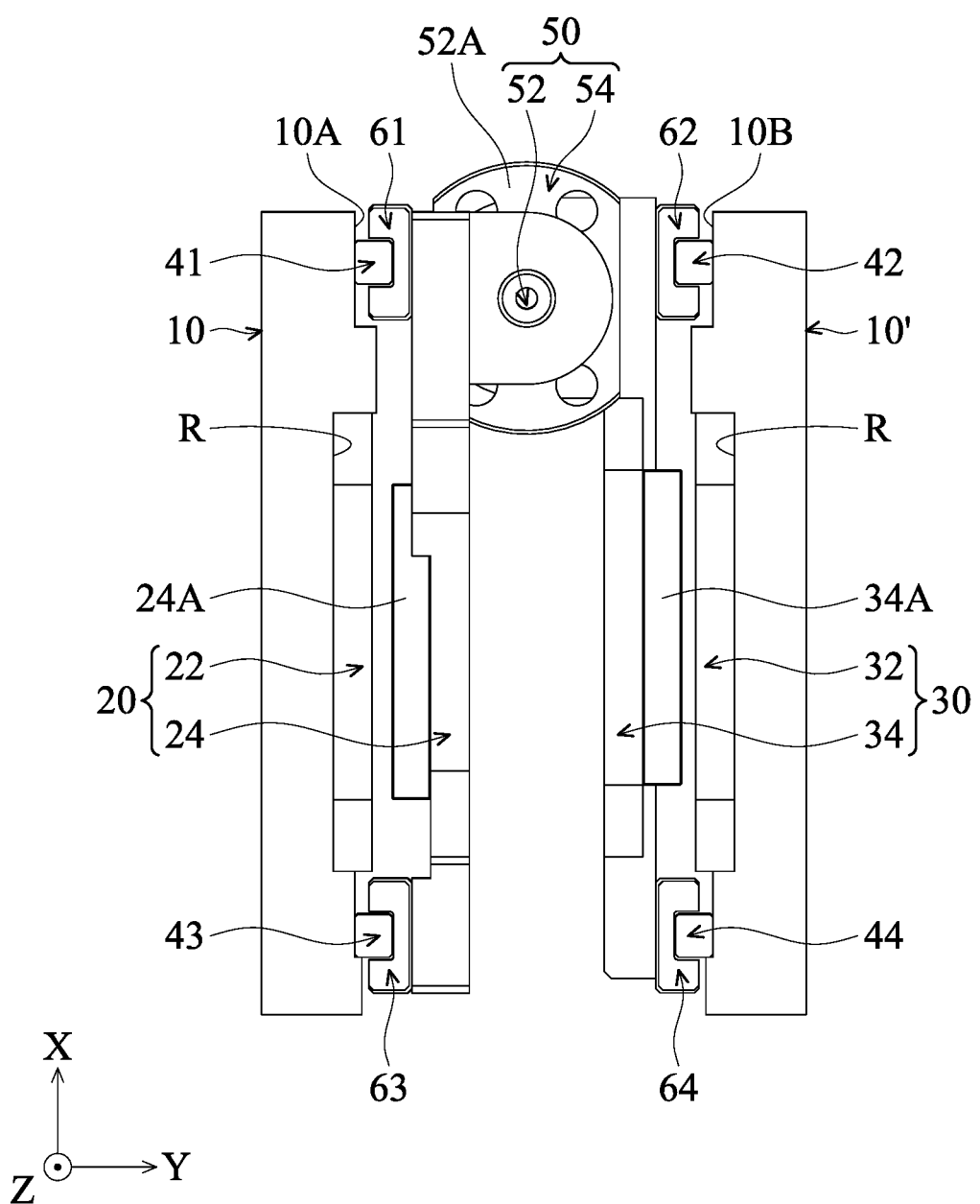

Referring to FIGS. 19 to 21, a linear-rotary actuator 5 in accordance with a fifth embodiment of the invention includes a first base 10, a second base 10', a first linear motor 20, a second linear motor 30, a first linear rail 41, a second linear rail 42, a third linear rail 43, a fourth linear rail 44, a ball screw 50, two first linear slide blocks 61, a second linear slide block 62, two third linear slide blocks 63, and a fourth linear slide block 64.

In this embodiment, the first base 10 and the second base 10' have flat plate structures and are arranged parallel to each other. Specifically, the first base 10 has a first side 10A adjacent to the second base 10' and the second base 10' has a second side 10B adjacent to the first base 10 (i.e. the first side 10A of the first base 10 and the second side 10B of the second base 10' face each other). Moreover, the first side 10A of the first base 10 and the second side 10B of the second base 10' respectively form a depressed long space R, wherein the long axes of the long spaces R are extended along a Z-axis defined in the drawings and the positions of the two long spaces R correspond to each other. In addition, the first base 10 and the second base 10' can be made of materials with high magnetic permeability (e.g. Nickel, steel, or an iron-nickel alloy).

The first linear motor 20 includes a first coil assembly 22 and a first magnet backplane 24. The first coil assembly 22 is fixed in the long space R on the first side 10A of the first base 10 along the Z-axis. The first magnet backplane 24 is movably disposed on the first side 10A of the first base 10 and has a first magnet 24A (FIG. 21) located on a side of the first magnet backplane 24 adjacent to the first base 10 and corresponding to the first coil assembly 22. The same as the embodiments described above, the first magnet backplane 24 can move linearly along the Z-axis with respect to the first coil assembly 22 (as the arrows indicate in FIG. 20).

Similarly, the second linear motor 30 includes a second coil assembly 32 and a second magnet backplane 34. The second coil assembly 32 is fixed in the long space R on the second side 10B of the second base 10' along the Z-axis. The second magnet backplane 34 is movably disposed on the second side 10B of the second base 10' and includes a second magnet 34A (FIG. 21) located on a side of the second magnet backplane 34 adjacent to the second base 10' and corresponding to the second coil assembly 32. The same as the embodiments described above, the second magnet backplane 34 can move linearly along the Z-axis with respect to the second coil assembly 32 (as the arrows indicate in FIG. 20).

The first linear rail 41 and the second linear rail 42 are respectively located on the first side 10A of the first base 10 and the second side 10B of the second base 10' along the Z-axis, and the positions of the first and second linear rails 41 and 42 correspond to each other. Also, the third linear rail 43 and the fourth linear rail 44 are respectively located on the first side 10A of the first base 10 and the second side 10B of the second base 10' along the Z-axis, wherein the third linear rail 43 is located on a side of the first coil assembly 22 opposite the first linear rail 41 and the fourth linear rail 44 is located on a side of the second coil assembly 32 opposite the second linear rail 42, and the positions of the third and fourth linear rails 43 and 44 correspond to each other. It should also be realized that the first linear motor 20, the second linear motor 30, the first linear rail 41, the second linear rail 42, the third linear rail 43, and the fourth linear rail 44 are arranged parallel to each other (parallel to the Z-axis).

The ball screw 50 includes a screw 52 and a nut 54. The screw 52 has at least one support base 52A (there are two support bases 52A in this embodiment) for supporting the main body of the screw 52 and allowing the main body of the screw 52 to rotate around its axial center. The nut 54 is screwed on the screw 52 and has a connecting base 54A.

As shown in FIGS. 19 to 21, the ball screw 50 is disposed between the first linear motor 20 and the second linear motor 30. Specifically, the two support bases 52A of the screw 52 are connected to the first magnet backplane 24 and coupled to the first linear rail 41 via the first linear slide block 61, and the connecting base 54A of the nut 54 is connected to the second magnet backplane 34 and coupled to the second linear rail 42 via the second linear slide block 62.

Moreover, the first magnet backplane 24 is further coupled to the third linear rail 43 via the third linear slide blocks 63, and the second magnet backplane 34 is further coupled to the fourth linear rail 44 via the fourth linear slide block 64. Accordingly, the stability and smoothness of the first and second magnet backplanes 24 and 34 while moving linearly can be increased further. Note that the shape of the first and second backplanes 24 and 34 shown in the drawings is for connecting the screw 52 (the support bases 52A), the nut 54 (the connecting base 54A), the third linear slide blocks 63, and the fourth linear slide block 64, but the invention is not limited thereto, and the shape of the first and second backplanes 24 and 34 can be designed according to actual needs.

With the structural designs described above, the screw 52 can be driven by the first linear motor 20 (i.e. when the first magnet backplane 24 moves linearly with respect to the first coil assembly 22) to move along the first linear rail 41, and the nut 54 can be driven by the second linear motor 30 (i.e. when the second magnet backplane 34 moves linearly with respect to the second coil assembly 32) to move along the second linear rail 42.

In particular, when the screw 52 and the nut 54 are respectively driven by the first and second linear motors 20 and 30 to move along the first and second linear rails 41 and 42 in a synchronized manner (i.e. the screw 52 and the nut 54 moves along the first and second linear rails 41 and 42 at the same speed and in the same direction), the linear-rotary actuator 5 can provide linear motion output (as the arrow D1 indicates in FIG. 19). On the other hand, when the nut 54 is driven by the second linear motor 30 to move along the second linear rail 42 in an asynchronous manner with respect to the screw 52 (this situation includes: the screw 52 and the nut 54 are respectively driven by the first and second linear motors 20 and 30 to move along the first and second linear rails 41 and 42 at different speeds or in different directions; or only the nut 54 is driven by the second linear motor 30 (but the screw 52 is not driven by the first linear motor 20) to move along the second linear rail 42 with respect to the screw 52), the nut 54 drives the screw 52 to rotate, so that the linear-rotary actuator 5 can provide rotary motion output (as the arrow D2 indicates in FIG. 19).

The linear-rotary actuator 5 can also provide linear and/or rotary motion outputs and thus is suitable for various applications. Moreover, since no additional servo rotary motor is required, the linear-rotary actuator 5 can solve the problems of the conventional linear-rotary actuator caused by using servo rotary motors.

Sixth Embodiment

Figure 22:
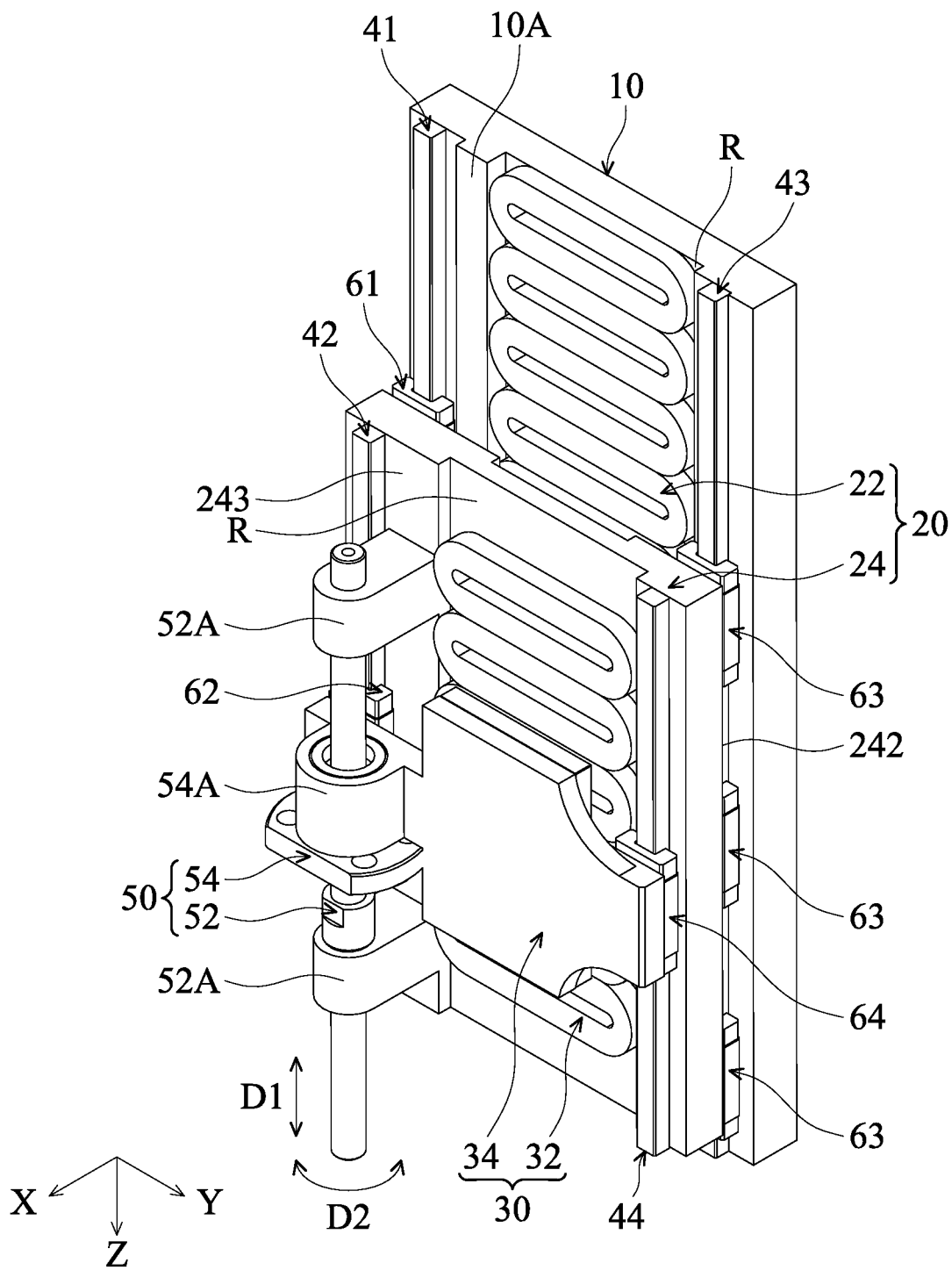
FIG. 22 is a schematic perspective view of a linear-rotary actuator in accordance with a sixth embodiment of the invention.
Figure 23:
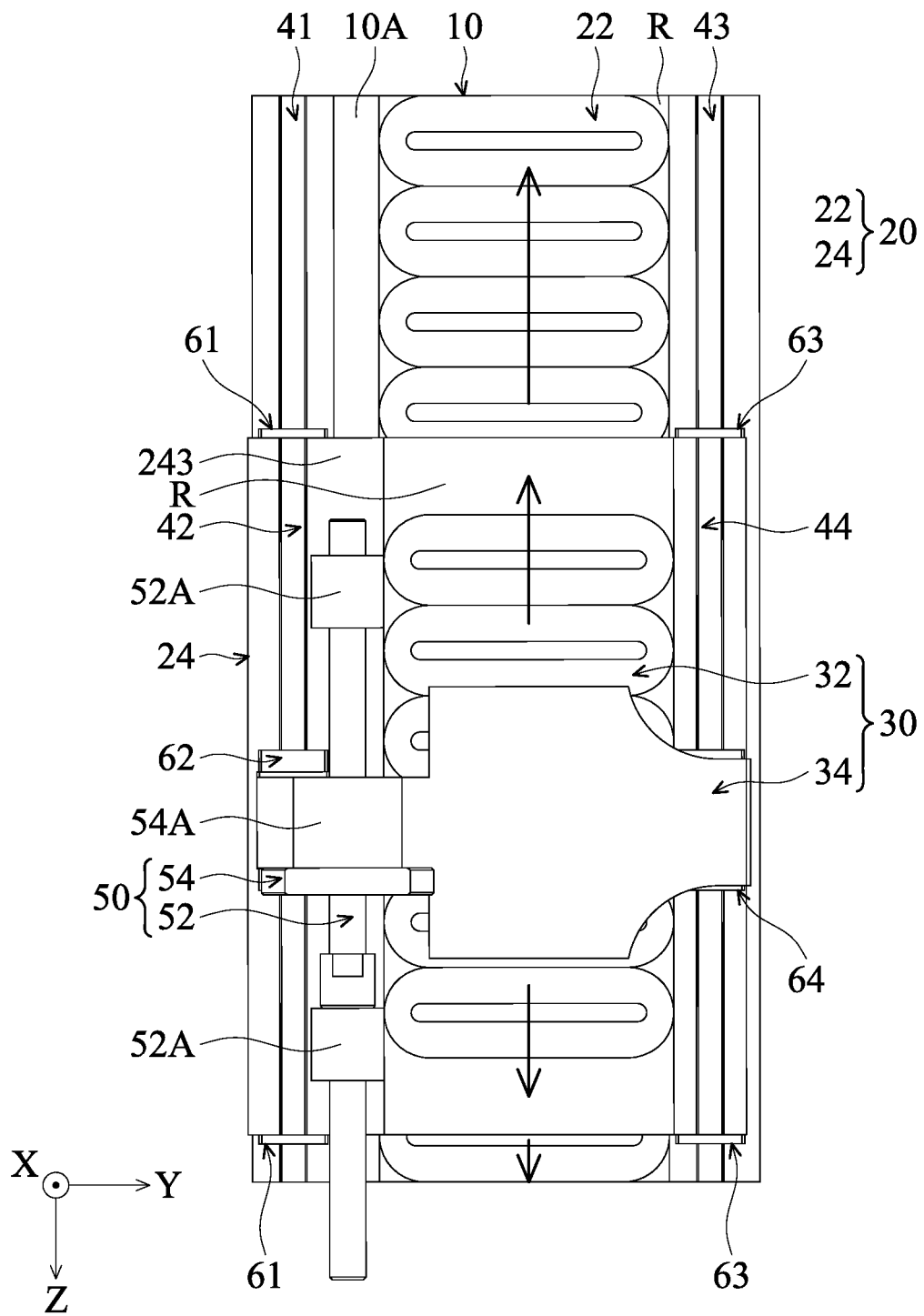
FIGS. 23 to 24 are schematic side views of the linear-rotary actuator in FIG. 22 from different viewing angles.
Figure 24:
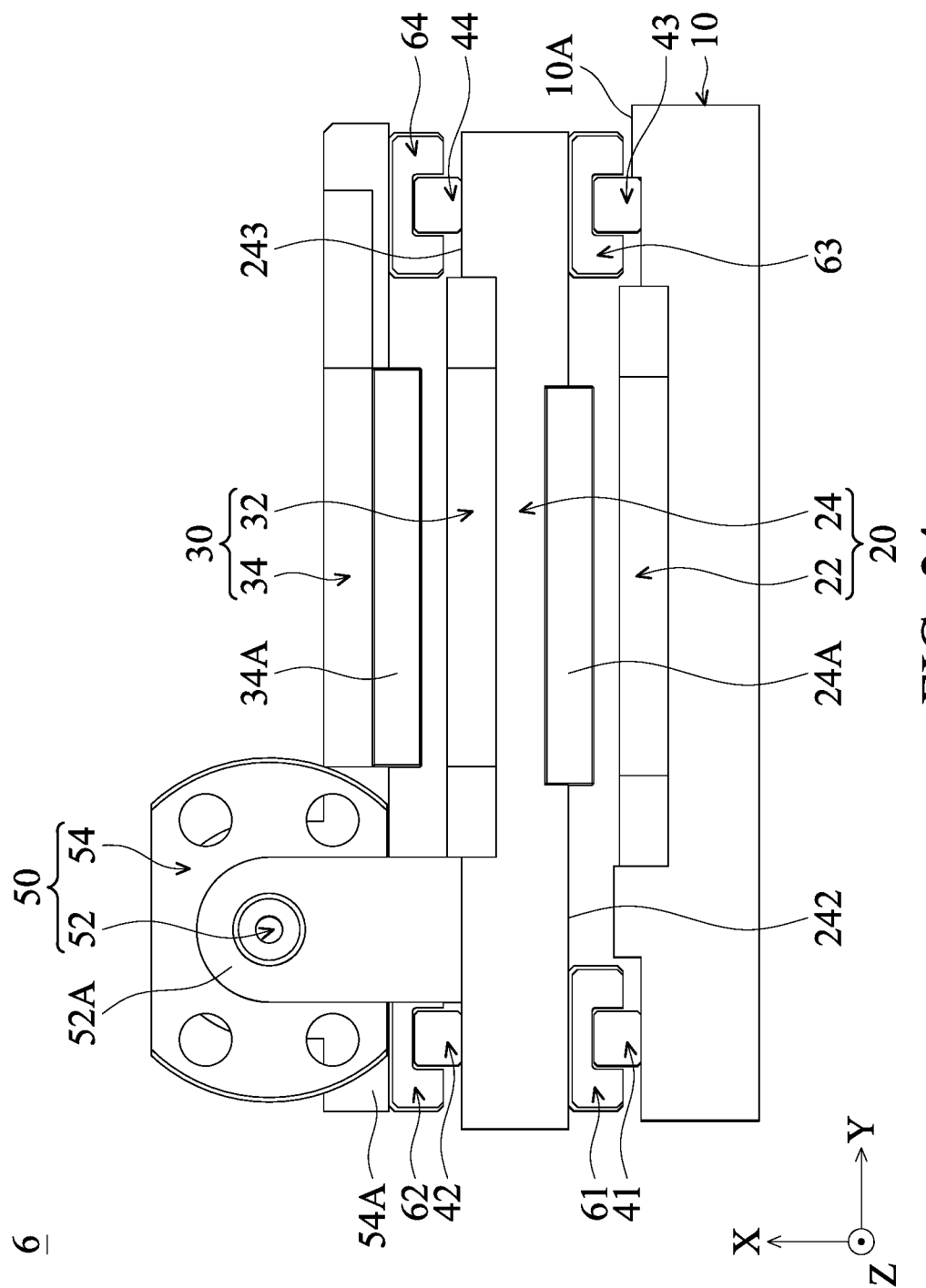

Referring to FIGS. 22 to 24, a linear-rotary actuator 6 in accordance with a sixth embodiment of the invention includes a base 10, a first linear motor 20, a second linear motor 30, a first linear rail 41, a second linear rail 42, a third linear rail 43, a fourth linear rail 44, a ball screw 50, three first linear slide blocks 61 (it should be realized that only two first linear slide blocks 61 are depicted in the drawings due to the restricted viewing angle), a second linear slide block 62, three third linear slide blocks 63, and a fourth linear slide block 64.

In this embodiment, the base 10 has a flat plate structure. Specifically, a first side 10A of the base 10 forms a depressed long space R, wherein the long axis of the long space R is extended along a Z-axis defined in the drawings. In addition, the base 10 can be made of materials with high magnetic permeability (e.g. Nickel, steel, or an iron-nickel alloy).

The first linear motor 20 includes a first coil assembly 22 and a first magnet backplane 24. The first coil assembly 22 is fixed in the long space R on the first side 10A of the base 10 along the Z-axis. The first magnet backplane 24 is movably disposed on the first side 10A of the base 10 and has a first magnet 24A (FIG. 24) located on a first side 242 of the first magnet backplane 24 facing the first side 10A of the base 10 and corresponding to the first coil assembly 22. The same as the embodiments described above, the first magnet backplane 24 can move linearly along the Z-axis with respect to the first coil assembly 22 (as the arrows indicate in FIG. 23). Note that the first magnet backplane 24 and the base 10 in this embodiment have substantially the same width in a Y-axis defined in the drawings. Moreover, a second side 243 of the first magnet backplane 24 opposite the first side 242 also forms a depressed long space R, wherein the long axis of the long space R is extended along the Z-axis and the positions of the two long spaces R on the first magnet backplane 24 and the base 10 correspond to each other.

The second linear motor 30 includes a second coil assembly 32 and a second magnet backplane 34. The second coil assembly 32 is fixed in the long space R on the second side 243 of the first magnet backplane 24 along the Z-axis. The second magnet backplane 34 is movably disposed on the second side 243 of the first magnet backplane 24 and has a second magnet 34A (FIG. 24) located on a side of the second magnet backplane 34 adjacent to the first magnet backplane 24 and corresponding to the second coil assembly 32. The same as the embodiments described above, the second magnet backplane 34 can move linearly along the Z-axis with respect to the second coil assembly 32 (as the arrows indicate in FIG. 23).

The first linear rail 41 and the second linear rail 42 are respectively located on the first side 10A of the base 10 and the second side 243 of the first magnet backplane 24 along the Z-axis, and the positions of the first and second linear rails 41 and 42 correspond to each other. Also, the third linear rail 43 and the fourth linear rail 44 are respectively located on the first side 10A of the base 10 and the second side 243 of the first magnet backplane 24 along the Z-axis, wherein the third linear rail 43 is located on a side of the first coil assembly 22 opposite the first linear rail 41 and the fourth linear rail 44 is located on a side of the second coil assembly 32 opposite the second linear rail 42, and the positions of the third and fourth linear rails 43 and 44 correspond to each other. It should also be realized that the first linear motor 20, the second linear motor 30, the first linear rail 41, the second linear rail 42, the third linear rail 43, and the fourth linear rail 44 are arranged parallel to each other (parallel to the Z-axis).

The ball screw 50 includes a screw 52 and a nut 54. The screw 52 has at least one support base 52A (there are two support bases 52A in this embodiment) for supporting the main body of the screw 52 and allowing the main body of the screw 52 to rotate around its axial center. The nut 54 is screwed on the screw 52 and has a connecting base 54A.

As shown in FIGS. 22 to 24, the ball screw 50 is disposed on the second side 243 of the first magnet backplane 24. Specifically, the two support bases 52A of the screw 52 are connected to the first magnet backplane 24 and the first magnet backplane 24 is coupled to the first linear rail 41 via the first linear slide blocks 61 (in this embodiment, the first magnet backplane 24 is between the support bases 52A and the first linear slide blocks 61), and the connecting base 54A of the nut 54 is connected to the second magnet backplane 34 and coupled to the second linear rail 42 via the second linear slide block 62.

Moreover, the first magnet backplane 24 is further coupled to the third linear rail 43 via the third linear slide blocks 63, and the second magnet backplane 34 is further coupled to the fourth linear rail 44 via the fourth linear slide block 64. Accordingly, the stability and smoothness of the first and second magnet backplanes 24 and 34 while moving linearly can be increased further. Note that the shape of the first and second backplanes 24 and 34 shown in the drawings is for connecting the screw 52 (the support bases 52A), the nut 54 (the connecting base 54A), the first linear slide blocks 61, the third linear slide blocks 63, and the fourth linear slide block 64, but the invention is not limited thereto, and the shape of the first and second backplanes 24 and 34 can be designed according to actual needs.

With the structural designs described above, the screw 52 can be driven by the first linear motor 20 (i.e. when the first magnet backplane 24 moves linearly with respect to the first coil assembly 22) to move along the first linear rail 41 (and the third linear rail 43), so that the linear-rotary actuator 6 can provide linear motion output (as the arrow D1 indicates in FIG. 22). On the other hand, the nut 42 can be driven by the second linear motor 34 (i.e. when the second magnet backplane 34 moves linearly with respect to the second coil assembly 32) to move along the second linear rail 42 and to drive the screw 52 to rotate, so that the linear-rotary actuator 6 can provide rotary motion output (as the arrow D2 indicates in FIG. 22).

The linear-rotary actuator 6 can also provide linear and/or rotary motion outputs and thus is suitable for various applications. Moreover, since no additional servo rotary motor is required, the linear-rotary actuator 6 can solve the problems of the conventional linear-rotary actuator caused by using servo rotary motors.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A linear-rotary actuator, comprising:

a base;

a first linear motor disposed on the base and including a first coil assembly and a first magnet backplane, wherein the first coil assembly is fixed and the first magnet backplane is movable;

a second linear motor disposed on the base and including a second coil assembly and a second magnet backplane, wherein the second coil assembly is fixed and the second magnet backplane is movable;

a first linear rail located on the base, wherein the first linear motor, the second linear motor, and the first linear rail are arranged parallel to each other; and a ball screw including a screw and a nut screwed together, wherein the screw is connected to the first magnet backplane and coupled to the first linear rail, and the nut is connected to the second magnet backplane and coupled to the first linear rail rail; wherein wherein, when the screw and the nut are respectively driven by the first and second linear motors to move along the first linear rail in a synchronized manner, the linear-rotary actuator provides linear motion output, whereas when the nut is driven by the second linear motor to move along the first linear rail in an asynchronous manner with respect to the screw, the linear-rotary actuator provides rotary motion output, wherein the first and second coil assemblies are located on a first side of the base, the first magnet backplane is on the first side of the base and movable with respect to the first coil assembly, the second magnet backplane is on the first side of the base and movable with respect to the second coil assembly, and the first linear rail is located on the first side of the base and between the first and second coil assemblies, and wherein the linear-rotary actuator further comprises:
- a first linear slide block and a second linear slide block, wherein the screw and the first magnet backplane are coupled to the first linear rail via the first linear slide block, and the nut and the second magnet backplane are coupled to the first linear rail via the second linear slide block; and
- a second linear rail, a third linear rail, a third linear slide block, and a fourth linear slide block, wherein the second linear rail is positioned on the first side of the base and located on a side of the first coil assembly opposite the first linear rail, the third linear rail is positioned on the first side of the base and located on a side of the second coil assembly opposite the first linear rail, and the first magnet backplane is coupled to the second linear rail via the third linear slide block, and the second magnet backplane is coupled to the third linear rail via the fourth linear slide block.

2. The linear-rotary actuator as claimed in claim 1, wherein the second and third linear rails are parallel to the first linear rail, the first linear motor, and the second linear motor.

3. The linear-rotary actuator as claimed in claim 1, wherein the screw has at least one support base for supporting a main body of the screw and allowing the main body of the screw to rotate around its axial center.

4. The linear-rotary actuator as claimed in claim 1, wherein the screw has two support bases, and the two support bases are connected to the first magnet backplane and coupled to the first linear rail via the first linear slide block.

5. The linear-rotary actuator as claimed in claim 1, wherein the nut is screwed on the screw and has a connecting base, the connecting base is connected to the second magnet backplane and coupled to the first linear rail via the second linear slide block.

* * * * *